US011266152B2

(12) United States Patent
Mierisch et al.

(10) Patent No.: US 11,266,152 B2
(45) Date of Patent: Mar. 8, 2022

(54) CONVEYER-TYPE OVEN

(71) Applicant: DMP Enterprises Pty Ltd, Port Melbourne (AU)

(72) Inventors: Andrew Colin Mierisch, Doncaster East (AU); Dominic Lamanna, Werribee (AU); Robert Graeme Price, Doncaster East (AU)

(73) Assignee: DMP Enterprises Pty Ltd, Port Melbourne (AU)

( * ) Notice: Subject to any disclaimer, the term of this patent is extended or adjusted under 35 U.S.C. 154(b) by 570 days.

(21) Appl. No.: 16/083,402

(22) PCT Filed: Mar. 8, 2017

(86) PCT No.: PCT/AU2017/050200
§ 371 (c)(1),
(2) Date: Sep. 7, 2018

(87) PCT Pub. No.: WO2017/152225
PCT Pub. Date: Sep. 14, 2017

(65) Prior Publication Data
US 2019/0090494 A1    Mar. 28, 2019

(30) Foreign Application Priority Data
Mar. 9, 2016    (AU) ................. 2016900882

(51) Int. Cl.
*A21B 1/24*    (2006.01)
*A21B 1/26*    (2006.01)
(Continued)

(52) U.S. Cl.
CPC ............... *A21B 1/245* (2013.01); *A21B 1/26* (2013.01); *A21B 1/48* (2013.01); *A21B 3/04* (2013.01)

(58) Field of Classification Search
CPC ...... A47J 37/08; A47J 37/0857; A47J 37/085; A21B 1/245; A21B 1/26; A21B 1/48; A21B 3/04
(Continued)

(56) References Cited

U.S. PATENT DOCUMENTS 2,778,914 A * 1/1957 Vallorani ............. H05B 1/0208
219/397
3,154,004 A * 10/1964 Huck .................. A47J 37/0807
99/390

(Continued)

OTHER PUBLICATIONS

May 23, 2017—International Search Report and Written Opinion of PCT/AU2017/050200.

*Primary Examiner* — Jimmy Chou
(74) *Attorney, Agent, or Firm* — Banner & Witcoff, Ltd.

(57) ABSTRACT

A conveyor-type oven is particularly well suited for cooking food products such as pizza. The oven may comprise a housing defining a baking chamber, and a primary chamber that is positioned beneath the baking chamber, the housing having an opening at each of the two longitudinal ends of the baking chamber. A continuous conveyor belt transports food to be cooked through the baking chamber, and a source of hot air is arranged to introduce hot air into the primary chamber. An upper plenum assembly is disposed in the baking chamber and includes a plurality of orifices from which to discharge hot air downwardly towards the conveyor belt, while a lower plenum assembly is disposed in the baking chamber and includes a plurality of orifices from which to discharge hot air upwardly towards the conveyor belt. Ducting interconnects the primary chamber with the upper and lower plenum assemblies, and one or more fans are operable to transport hot air from the primary chamber through the ducting to the upper and lower plenum assemblies. The conveyor-type oven enables fast, even cooking of (Continued)

food products while maintaining a relatively small floor-space footprint.

19 Claims, 16 Drawing Sheets

(51) Int. Cl.
 *A21B 1/48* (2006.01)
 *A21B 3/04* (2006.01)
(58) Field of Classification Search
 USPC .................................. 99/386, 391, 443 C
 See application file for complete search history.

(56) References Cited

U.S. PATENT DOCUMENTS

| | | | | |
|---|---|---|---|---|
| 3,257,544 A * | 6/1966 | Benjamin, Jr. | ...... | H05B 1/0244 219/486 |
| 3,736,860 A * | 6/1973 | Vischer, Jr. | ............. | F24C 7/087 99/339 |
| 4,065,659 A * | 12/1977 | Yount | ................ | A47J 37/0623 219/398 |
| 4,176,589 A * | 12/1979 | Stuck | .................... | A47J 37/044 99/386 |
| 4,238,670 A * | 12/1980 | Maitenaz | ................ | F24C 14/02 219/413 |
| 4,281,594 A * | 8/1981 | Baker | .................... | A47J 37/044 99/386 |
| 4,302,661 A * | 11/1981 | Perry, Jr. | ................. | F24C 14/00 219/398 |
| 4,337,893 A * | 7/1982 | Flanders | ............ | G05D 23/1917 237/7 |
| 4,377,109 A * | 3/1983 | Brown | .................... | A21B 1/48 126/21 A |
| 4,389,562 A * | 6/1983 | Chaudoir | ................ | A21B 1/22 219/388 |
| 4,438,572 A * | 3/1984 | Kaminski | ................ | A21B 1/26 34/218 |
| 4,462,383 A * | 7/1984 | Henke | .................... | A21B 1/245 126/21 A |
| 4,471,750 A * | 9/1984 | Burtea | .................... | A21B 1/48 126/19 R |
| 4,474,498 A * | 10/1984 | Smith | .................... | A21B 1/245 219/388 |
| 4,479,776 A * | 10/1984 | Smith | .................... | A21B 1/245 219/388 |
| 4,492,839 A * | 1/1985 | Smith | .................... | A21B 1/245 219/684 |
| 4,538,049 A * | 8/1985 | Ryckman, Jr. | ........... | F24C 7/087 219/386 |
| 4,554,437 A * | 11/1985 | Wagner | .................... | A21B 1/48 219/388 |
| 4,556,043 A * | 12/1985 | Bratton | .................. | A21B 1/245 126/21 A |
| 4,576,090 A * | 3/1986 | Burtea | .................... | A21B 1/48 126/21 A |
| 4,591,333 A * | 5/1986 | Henke | .................... | A21B 1/245 432/10 |
| 4,626,661 A * | 12/1986 | Henke | ...................... | F27D 7/04 219/388 |
| 4,679,542 A * | 7/1987 | Smith | .................... | A21B 1/245 126/21 A |
| 4,701,340 A * | 10/1987 | Bratton | ................. | A47J 37/044 426/511 |
| 4,749,581 A * | 6/1988 | Gorsuch | ................ | A21B 1/245 426/505 |
| 4,753,215 A * | 6/1988 | Kaminski | ................ | A21B 1/245 126/21 A |
| 4,757,800 A * | 7/1988 | Shei | ...................... | A21B 1/245 126/21 A |
| 4,772,779 A * | 9/1988 | Scheidler | ............... | H05B 3/748 219/448.11 |
| 4,781,169 A * | 11/1988 | Henke | ................... | A47J 37/045 126/21 A |
| 4,831,237 A * | 5/1989 | Gelineau | ................ | F24C 14/02 219/398 |
| 4,834,063 A * | 5/1989 | Hwang | .................... | A21B 1/245 126/21 A |
| 4,873,107 A * | 10/1989 | Archer | .................... | A21B 1/245 426/520 |
| 4,881,519 A * | 11/1989 | Henke | .................... | A21B 1/245 126/21 A |
| 4,924,763 A * | 5/1990 | Bingham | ................. | A21B 1/26 126/21 A |
| 4,936,286 A * | 6/1990 | Baker | .................... | A47J 37/044 126/41 C |
| 4,940,040 A * | 7/1990 | Randall | .................... | A21B 1/26 126/21 A |
| 4,951,648 A * | 8/1990 | Shukla | .................... | A21B 1/245 126/21 A |
| 4,960,100 A * | 10/1990 | Pellicane | ................ | A21B 1/245 126/21 A |
| 4,964,392 A * | 10/1990 | Bruno | ...................... | A21B 1/48 126/21 A |
| 4,965,435 A * | 10/1990 | Smith | .................... | A21B 1/245 126/21 A |
| 5,013,563 A * | 5/1991 | Stuck | .................... | A47J 37/044 219/388 |
| 5,025,775 A * | 6/1991 | Crisp | .................... | A21B 1/245 126/21 A |
| 5,131,841 A * | 7/1992 | Smith | .................... | A21B 1/245 126/21 A |
| 5,170,039 A * | 12/1992 | Eisenberg | ............... | A47J 37/08 219/236 |
| 5,180,898 A * | 1/1993 | Alden | .................... | A47J 37/044 219/388 |
| 5,185,172 A * | 2/1993 | Barkhau | ................ | A21B 1/245 426/383 |
| 5,197,375 A * | 3/1993 | Rosenbrock | ............ | A21B 1/40 219/388 |
| 5,205,274 A * | 4/1993 | Smith | ................... | H05B 6/6411 126/21 A |
| 5,239,917 A * | 8/1993 | Lutkie | ...................... | A21B 1/48 126/21 A |
| 5,253,564 A * | 10/1993 | Rosenbrock | ............. | A21B 1/40 99/326 |
| 5,276,978 A * | 1/1994 | Hopkins | ................. | D06C 7/00 34/203 |
| 5,321,920 A | 6/1994 | Silchen | | |
| 5,351,416 A * | 10/1994 | Witkin | .................. | F26B 23/022 34/79 |
| 5,361,749 A * | 11/1994 | Smith | .................... | F24C 15/006 126/19 R |
| 5,398,666 A * | 3/1995 | Smith | .................... | A21B 1/245 126/21 A |
| 5,401,940 A * | 3/1995 | Smith | .................... | A21B 1/245 219/679 |
| 5,423,248 A * | 6/1995 | Smith | .................... | A21B 1/245 126/21 A |
| 5,454,295 A * | 10/1995 | Cox | .................... | A21B 1/245 126/21 A |
| 5,584,237 A * | 12/1996 | Moshonas | ............... | A21B 1/245 126/21 A |
| 5,588,354 A * | 12/1996 | Stuck | .................... | A47J 37/044 99/349 |
| 5,640,896 A * | 6/1997 | Stuck | .................. | A47J 37/0713 99/391 |
| 5,655,511 A * | 8/1997 | Prabhu | .................. | F24C 15/006 126/19 R |
| 5,671,660 A * | 9/1997 | Moshonas | ............... | A21B 1/245 126/21 A |
| 5,673,610 A * | 10/1997 | Stuck | .................... | A47J 37/0857 99/349 |
| 5,676,044 A * | 10/1997 | Lara, Jr. | .................... | A21B 1/245 126/21 A |
| 5,717,192 A * | 2/1998 | Dobie | .................... | A21B 1/245 219/681 |

(56) References Cited

U.S. PATENT DOCUMENTS

| | | | | |
|---|---|---|---|---|
| 5,727,451 A * | 3/1998 | DeMars | A47J 37/044 | 99/386 |
| 5,818,014 A * | 10/1998 | Smith | G07F 9/105 | 219/679 |
| 5,821,503 A * | 10/1998 | Witt | A21B 1/48 | 219/388 |
| 5,832,812 A * | 11/1998 | Wolfe | A21B 1/245 | 99/443 C |
| 5,964,044 A * | 10/1999 | Lauersdorf | A21B 1/245 | 126/21 A |
| 6,016,935 A * | 1/2000 | Huegerich | B67D 1/0007 | 222/146.1 |
| 6,051,818 A * | 4/2000 | Van Der Wal | H05B 1/0258 | 219/486 |
| 6,080,972 A * | 6/2000 | May | A21B 1/02 | 219/486 |
| 6,131,559 A * | 10/2000 | Norris | F24C 15/006 | 126/21 A |
| RE36,941 E * | 11/2000 | Wolfe | A21B 1/245 | 126/21 A |
| 6,146,677 A * | 11/2000 | Moreth | A21B 1/44 | 426/505 |
| 6,157,002 A * | 12/2000 | Schjerven, Sr. | A21B 1/48 | 219/388 |
| 6,201,218 B1 * | 3/2001 | Chandler | A47J 37/044 | 198/586 |
| 6,205,910 B1 * | 3/2001 | Vaughn | A47J 37/08 | 219/521 |
| 6,223,650 B1 * | 5/2001 | Stuck | A47J 37/0857 | 99/349 |
| 6,252,201 B1 * | 6/2001 | Nevarez | A21B 1/26 | 126/21 A |
| 6,320,165 B1 * | 11/2001 | Ovadia | A21B 1/245 | 126/21 A |
| 6,386,095 B1 * | 5/2002 | Ausaf | A47J 37/044 | 99/419 |
| 6,389,960 B1 * | 5/2002 | Williams | A47J 37/0713 | 126/39 J |
| 6,462,319 B1 * | 10/2002 | Uy | H05B 6/6405 | 126/21 A |
| 6,495,182 B1 * | 12/2002 | Stuck | A21B 3/07 | 221/1 |
| 6,526,961 B1 * | 3/2003 | Hardenburger | A21B 1/48 | 126/21 A |
| 6,539,934 B2 * | 4/2003 | Moshonas | A21B 1/245 | 126/21 A |
| 6,572,911 B1 * | 6/2003 | Corcoran | A21B 1/245 | 426/510 |
| 6,576,874 B2 * | 6/2003 | Zapata | A21B 1/245 | 219/388 |
| 6,592,364 B2 * | 7/2003 | Zapata | F27B 9/10 | 126/21 A |
| 6,595,117 B1 * | 7/2003 | Jones | A21B 1/245 | 99/386 |
| 6,624,396 B2 * | 9/2003 | Witt | A21B 1/42 | 219/388 |
| 6,638,553 B2 * | 10/2003 | Bell | A21B 1/48 | 198/602 |
| 6,655,373 B1 * | 12/2003 | Wiker | F23D 14/84 | 126/21 A |
| 6,684,657 B1 * | 2/2004 | Dougherty | A47J 39/003 | 165/918 |
| 6,684,875 B1 * | 2/2004 | Schjerven, Sr. | A21B 1/245 | 126/116 A |
| 6,718,965 B2 * | 4/2004 | Rummel | F24C 15/322 | 126/21 A |
| 6,723,961 B2 * | 4/2004 | Choat | H05B 6/6476 | 126/21 A |
| 6,817,283 B2 * | 11/2004 | Jones | A21B 1/245 | 99/386 |
| 6,880,545 B2 * | 4/2005 | Heber | A21B 1/245 | 126/21 A |
| 6,933,473 B2 * | 8/2005 | Henke | A21B 1/245 | 219/388 |
| 6,936,793 B1 * | 8/2005 | Shiloh | B23K 1/008 | 219/400 |
| 7,007,807 B1 * | 3/2006 | Stockard | A21B 1/48 | 209/592 |
| 7,026,579 B2 * | 4/2006 | Burtea | A21B 1/48 | 219/388 |
| 7,038,172 B1 * | 5/2006 | Stuck | A47J 37/044 | 219/388 |
| 7,059,317 B2 * | 6/2006 | Kobayashi | A47J 37/044 | 126/21 A |
| 7,091,452 B2 * | 8/2006 | Kingdon | A21B 1/48 | 219/388 |
| 7,258,881 B2 * | 8/2007 | Jones | A21B 1/245 | 426/233 |
| 7,297,903 B1 * | 11/2007 | March | A47J 37/0857 | 219/388 |
| 7,340,992 B1 * | 3/2008 | Wolfe | A21B 1/245 | 126/21 A |
| 7,541,559 B2 * | 6/2009 | Milz | A21B 1/245 | 219/388 |
| 7,624,728 B1 * | 12/2009 | Forbes | A21B 1/245 | 126/21 A |
| 7,800,023 B2 * | 9/2010 | Burtea | A21B 1/02 | 219/411 |
| 7,851,727 B2 * | 12/2010 | Burtea | A21B 2/00 | 219/411 |
| 8,087,407 B2 * | 1/2012 | Wiker | A21B 1/40 | 126/21 A |
| 8,093,533 B2 * | 1/2012 | French | A21B 1/245 | 219/388 |
| 8,113,190 B2 * | 2/2012 | Dougherty | A21B 1/245 | 126/21 A |
| 8,294,070 B2 * | 10/2012 | McNamee | H05B 6/6485 | 219/679 |
| 8,536,493 B1 * | 9/2013 | Wolfe | A21B 1/48 | 219/400 |
| 8,637,792 B2 * | 1/2014 | Agnello | A21B 2/00 | 219/388 |
| 8,642,928 B2 * | 2/2014 | Schulte | F24C 15/2042 | 219/400 |
| 8,748,783 B2 * | 6/2014 | Hensel | A47J 37/0635 | 219/483 |
| 8,776,773 B1 * | 7/2014 | Wolfe | A21B 1/245 | 126/21 A |
| 8,839,714 B2 * | 9/2014 | Schjerven, Sr. | A47J 37/045 | 99/476 |
| 8,869,684 B2 * | 10/2014 | Ajmera | A21B 3/00 | 99/443 R |
| 9,089,142 B2 * | 7/2015 | Henke | A23L 5/17 | |
| 9,149,154 B1 * | 10/2015 | Stuck | A47J 39/003 | |
| 9,585,400 B2 * | 3/2017 | Wiker | A21B 1/40 | |
| 9,924,832 B2 * | 3/2018 | Bauer | A47J 37/0857 | |
| 10,024,548 B2 * | 7/2018 | Wiker | F24C 14/025 | |
| 2001/0022178 A1 * | 9/2001 | Knost | A21B 1/48 | 126/21 A |
| 2003/0041851 A1 * | 3/2003 | Kingdon | A21B 1/26 | 126/21 R |
| 2003/0056658 A1 * | 3/2003 | Jones | A23L 5/17 | 99/386 |
| 2003/0213371 A1 * | 11/2003 | Saunders | A47J 37/0857 | 99/327 |
| 2004/0250688 A1 * | 12/2004 | Farkas | A21B 1/48 | 99/386 |
| 2005/0109216 A1 * | 5/2005 | Jones | A23L 5/17 | 99/386 |
| 2005/0139203 A1 * | 6/2005 | Jones | A21B 1/245 | 126/21 A |
| 2005/0139204 A1 * | 6/2005 | Berti | A21B 1/245 | 126/21 A |
| 2005/0274373 A1 * | 12/2005 | Pesonen | F27D 7/06 | 126/21 A |
| 2006/0087136 A1 * | 4/2006 | Pearl | A47F 13/08 | 294/176 |

(56) References Cited

U.S. PATENT DOCUMENTS

| | | | |
|---|---|---|---|
| 2006/0185525 A1* | 8/2006 | Kuenen | A21B 1/26 99/386 |
| 2006/0243721 A1* | 11/2006 | Sorensen | A21B 3/04 219/401 |
| 2007/0006865 A1* | 1/2007 | Wiker | F24C 3/122 126/21 A |
| 2007/0012307 A1* | 1/2007 | Wiker | A21B 1/40 126/21 A |
| 2007/0137633 A1* | 6/2007 | McFadden | H05B 6/60 126/21 A |
| 2007/0272228 A1* | 11/2007 | Slaby | F24H 3/087 126/104 A |
| 2008/0022993 A1* | 1/2008 | Moretti | A21B 1/48 126/21 A |
| 2008/0067166 A1* | 3/2008 | Yoder | A47J 37/044 219/413 |
| 2008/0087173 A1* | 4/2008 | Milz | A21B 1/245 99/331 |
| 2008/0092754 A1* | 4/2008 | Noman | A21B 1/245 99/443 C |
| 2008/0141868 A1* | 6/2008 | Cook | A47J 37/045 99/386 |
| 2008/0149087 A1* | 6/2008 | Wolfe | F24C 15/325 126/21 A |
| 2008/0182214 A1* | 7/2008 | Cox | F23N 1/045 431/12 |
| 2008/0216812 A1* | 9/2008 | Dougherty | A21B 1/245 126/21 A |
| 2008/0289619 A1* | 11/2008 | Schjerven, Sr. | A47J 37/045 126/41 R |
| 2009/0075224 A1* | 3/2009 | Wiker | A21B 1/40 432/8 |
| 2010/0058936 A1* | 3/2010 | Schjerven, Sr. | A21B 1/245 99/443 C |
| 2010/0104997 A1* | 4/2010 | Wolfe | A21B 1/245 432/152 |
| 2010/0319551 A1* | 12/2010 | Cox | F23N 1/045 99/443 C |
| 2011/0020492 A1* | 1/2011 | Ajmera | A21D 8/02 426/19 |
| 2011/0048244 A1* | 3/2011 | Wiker | A21B 1/245 99/331 |
| 2011/0048245 A1* | 3/2011 | Schjerven, Sr. | A21B 1/245 99/331 |
| 2011/0209629 A1* | 9/2011 | Lauer | A21B 1/48 99/443 C |
| 2011/0210114 A1* | 9/2011 | Lauer | F24F 5/0096 219/388 |
| 2011/0269085 A1* | 11/2011 | Wiker | A21B 3/04 432/4 |
| 2011/0277643 A1* | 11/2011 | Schwierking | A47J 36/32 99/331 |
| 2011/0283894 A1* | 11/2011 | Schjerven, Sr. | A21B 1/245 99/443 C |
| 2012/0180775 A1* | 7/2012 | Waltz | A21B 1/245 126/15 R |
| 2013/0000628 A1* | 1/2013 | Wiker | F24C 14/02 126/21 A |
| 2013/0192583 A1* | 8/2013 | Chang | F24C 15/00 126/21 A |
| 2013/0239822 A1* | 9/2013 | McKee | A47J 37/044 99/443 C |
| 2013/0306616 A1* | 11/2013 | Wildebush | A47J 37/044 219/413 |
| 2014/0144331 A1* | 5/2014 | Hensel | A47J 37/0807 99/391 |
| 2014/0199446 A1* | 7/2014 | Huegerich | A47J 37/044 426/233 |
| 2014/0220197 A1* | 8/2014 | Hocker | B65G 15/00 426/233 |
| 2014/0261371 A1* | 9/2014 | Van Camp | A21B 1/48 126/21 A |
| 2014/0331870 A1* | 11/2014 | Anders | A22C 11/003 99/443 C |
| 2015/0157171 A1* | 6/2015 | Janecka | A47J 37/048 99/427 |
| 2016/0050939 A1* | 2/2016 | Riggle | A21B 1/26 126/21 A |
| 2016/0174572 A1* | 6/2016 | Taslagyan | A47J 37/042 99/443 C |

* cited by examiner

CONVEYER-TYPE OVEN

The application is a U.S. National Stage application under 35 U.S.C. § 371 of International Application No. PCT/AU2017/050200 filed on Mar. 8, 2017, designating the United States of America and claiming priority to Australian Patent Application No. 2016900882 filed on Mar. 9, 2016. The present application claims priority to and the benefit of the above-identified applications and the above-identified applications are incorporated by reference herein in their entirety.

FIELD OF THE INVENTION

The present invention relates to a conveyor-type oven for cooking food.

BACKGROUND

Conveyor-type ovens are often used in the commercial food and hospitality industries for baking food products in a fast, reliable and consistent manner. The prepared, uncooked food is loaded on a conveyor belt on one side of the oven, and the conveyor belt transports the food through the baking chamber at a selected speed. The cooked food arrives at the opposing side. These types of oven are often used for baking pizzas in commercial quantities because there is minimal user intervention required during the cooking process, once the baking chamber conditions and conveyor belt speeds have been set.

Conveyor-type ovens cook food using either by radiant heat transfer that is generated by resistive heating elements in the baking chamber, or by convective heat transfer via hot air that is generated by a source and supplied to the baking chamber. Typically, convective heat transfer conveyor-type ovens have a gas burner, and fans and ducting that transports the exhausted hot gases to the baking chamber.

The evenness of temperature in the length and width directions of the baking chamber has a significant impact on the cooking performance of a conveyor-type oven. When used in cooking pizza, variations in temperature can affect the colour and/or "doneness" of the pizza exiting the baking chamber. Considerable effort is made by manufacturers and users of conveyor-type ovens to provide even temperatures. To this end, manufacturers have provided conveyor-type ovens with a high degree of customization so that, in turn, users can "tweak" the oven, with the aim to provide a suitably cooked product, in the shortest time possible.

In addition, conveyor-type ovens tend to have a large footprint. For many shop owners, the allocation of floor space in their shop is a significant consideration, as this affects the business overheads. The oven installation may represent a substantial portion of that floor space, and also places constraints on the movement of staff within the store. Thus, for many shop owners, it is desirable that the footprint of the oven is minimized.

Accordingly, it is desired to address one or more of the above issues, and/or at least provide a useful alternative.

SUMMARY OF THE INVENTION

The present invention provides a conveyor-type oven comprising:

a housing defining a baking chamber, and a primary chamber that is positioned beneath the baking chamber, the housing having an opening at each of the two longitudinal ends of the baking chamber;

a source of hot air that is arranged to introduce hot air into the primary chamber;

a continuous conveyor belt for transporting food to be cooked through the baking chamber;

an upper plenum assembly that is disposed in the baking chamber and includes a plurality of orifices from which to discharge hot air downwardly towards the conveyor belt;

a lower plenum assembly that is disposed in the baking chamber and includes a plurality of orifices from which to discharge hot air upwardly towards the conveyor belt;

ducting that interconnects the primary chamber with the upper and lower plenum assemblies; and one or more fans that are operable to transport hot air from the primary chamber through the ducting to the upper and lower plenum assemblies.

Preferably, the lower plenum assembly comprises two or more lower plenum chambers, and the ducting includes two or more lower ducts, wherein each lower duct opens into a respective lower plenum chamber.

In some embodiments, the housing includes a divider between the primary chamber and the baking chamber, the divider having a divider opening, whereby, in use, air within the baking chamber is able to propagate through the divider opening and into the primary chamber.

In certain embodiments, the lower plenum chambers are spaced apart, such that, in use of the oven, air within the baking chamber is able to propagate through the space between the lower plenum chambers, through the divider opening, and into the primary chamber. Preferably, the lower plenum chambers are spaced apart in the longitudinal direction.

Preferably, the divider opening is vertically aligned with the separation of the lower plenum chambers.

Alternatively or additionally, the lower plenum assembly can have a floor that is spaced from the divider, such that, in use of the oven, air within the baking chamber is able to propagate beneath the lower plenum assembly, through the divider opening, and into the primary chamber.

In at least some embodiments, the upper plenum assembly is arranged to provide an air curtain effect across each of the openings. Preferably, the opposing ends of the upper plenum assembly are closer to the openings than the opposing ends of the lower plenum assembly. In at least some preferred embodiment, the density of orifices in the upper plenum assembly is higher in regions adjacent the openings, compared with a central region of the upper plenum assembly.

The ducting can include one or more upper ducts that each extends upwardly beside the baking chamber and opens into the upper manifold assembly. In preferred embodiments, the oven has two upper ducts.

In certain embodiments, the ducting includes a manifold portion that is to receive hot air from the fans, and opens into the upper and lower ducts. In some embodiments, the ducting is configured such that at least some hot air discharged from the fans can follow a generally linear path through the manifold portion and into the lower ducts.

The conveyor belt can be part of a conveyor assembly that comprises:

a first outer portion that supports the conveyor belt outwardly of a first of the openings;

a second outer portion that supports the conveyor belt outwardly of a second of the openings;

a first drum mounted on the first outer portion about which the conveyor belt is to rotate;

a second drum mounted on the second outer portion about which the conveyor belt is to rotate; and a drive for causing the conveyor belt to rotate.

The conveyor assembly can further comprise a support frame that extends through the baking chamber, and provides vertical support to the belt. In certain embodiments, the support frame extends outwardly of the baking chamber. The support frame can include an upper frame that is to support the belt whilst transporting food to be cooked through the baking chamber. The support frame can also include a lower frame that is to support the belt in a return traversal of the baking chamber.

At least some sections of the support frame are curved in a vertical plane. The upper and/or lower frames can each include two or more frame sections. Preferably, each frame section is curved in a vertical plane.

The support frame can include first support members, and second support members, the first support members being non-parallel with the second support members. Preferably, the first support members extend generally transversely to the direction of movement of the conveyor belt. Preferably, the second support members extend obliquely to the direction of movement of the conveyor belt.

In some embodiments, the oven has a bank of one or more fans at each longitudinal end of primary chamber.

The source of hot air can be a gas burner that is arranged to introduce hot air into the primary chamber.

BRIEF DESCRIPTION OF THE DRAWINGS

In order that the invention may be more easily understood, embodiments will now be described, by way of example only, with reference to the accompanying drawings, in which.

DETAILED DESCRIPTION

Figure 1:
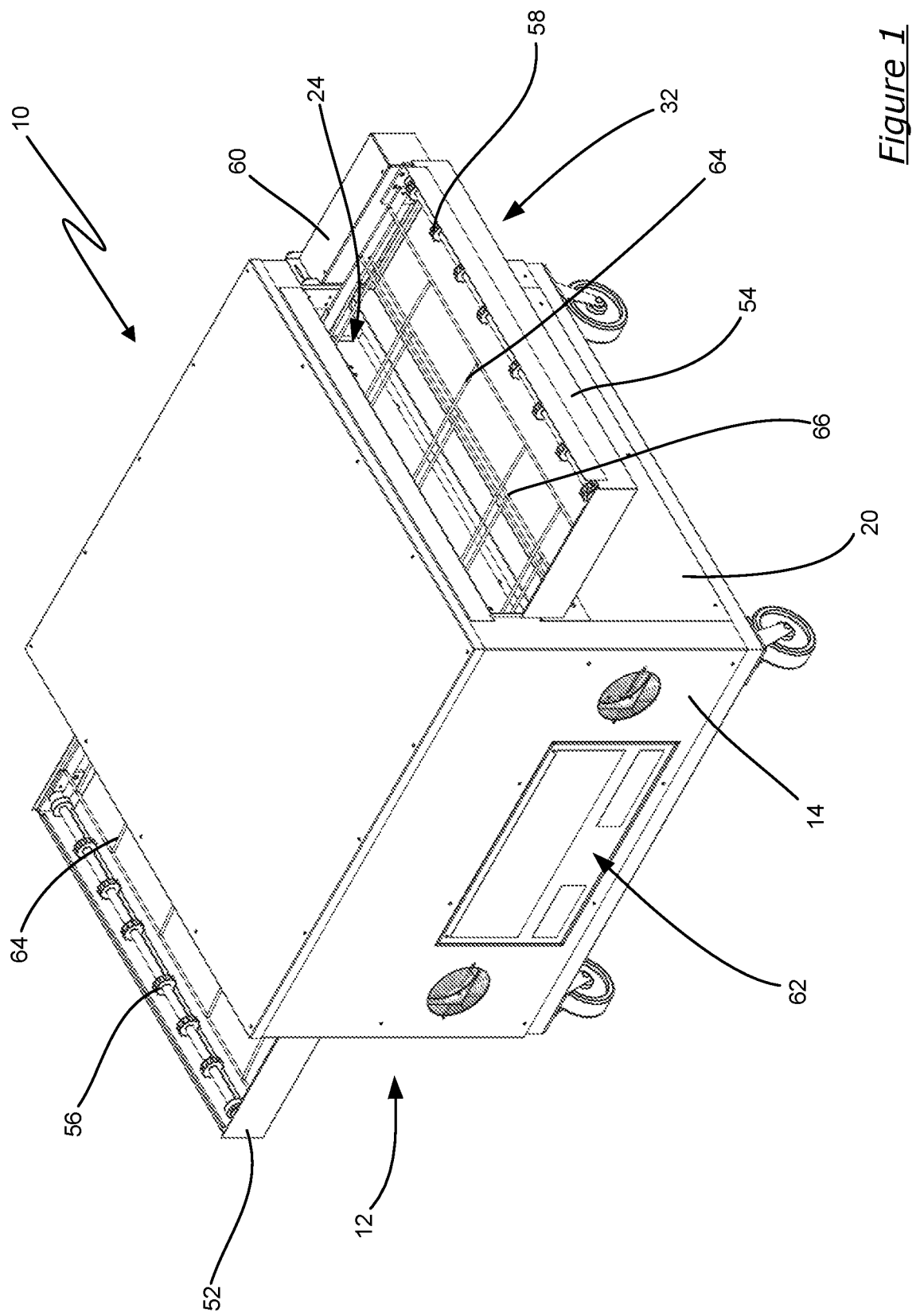
FIG. 1: is a perspective view of a conveyor-type oven in accordance with a first embodiment of the present invention.
Figure 2:
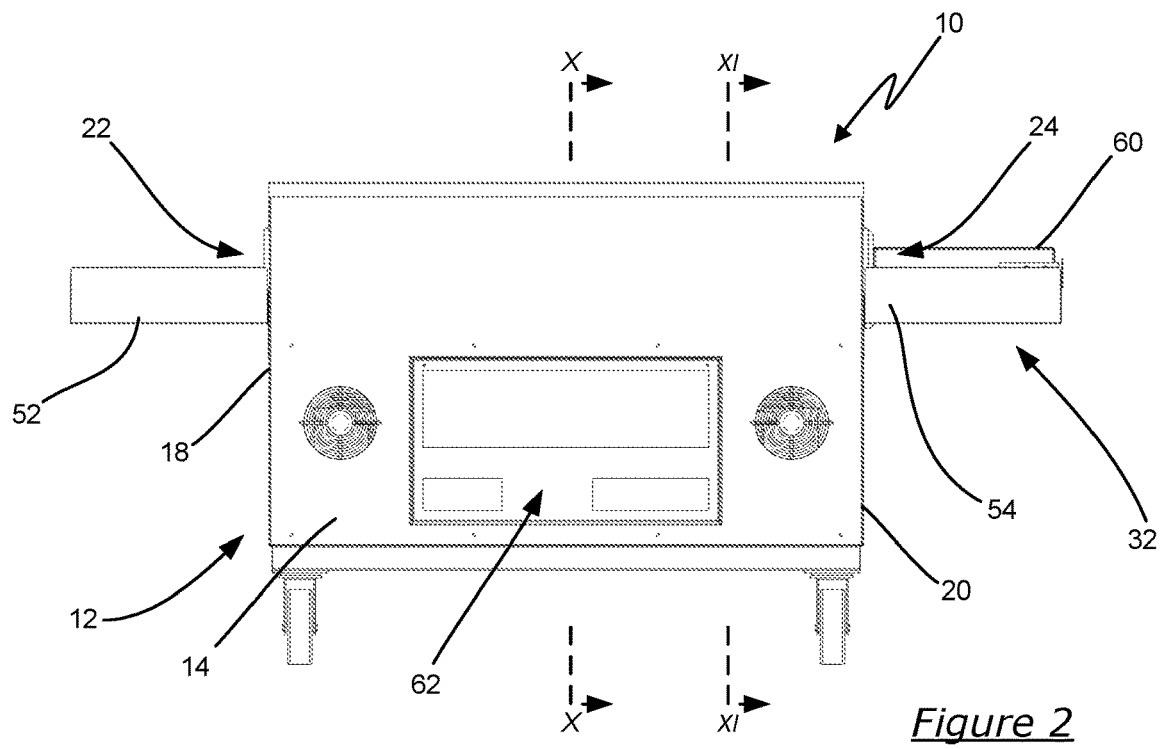
FIG. 2: is a front view of the oven of FIG. 1.
Figure 3:
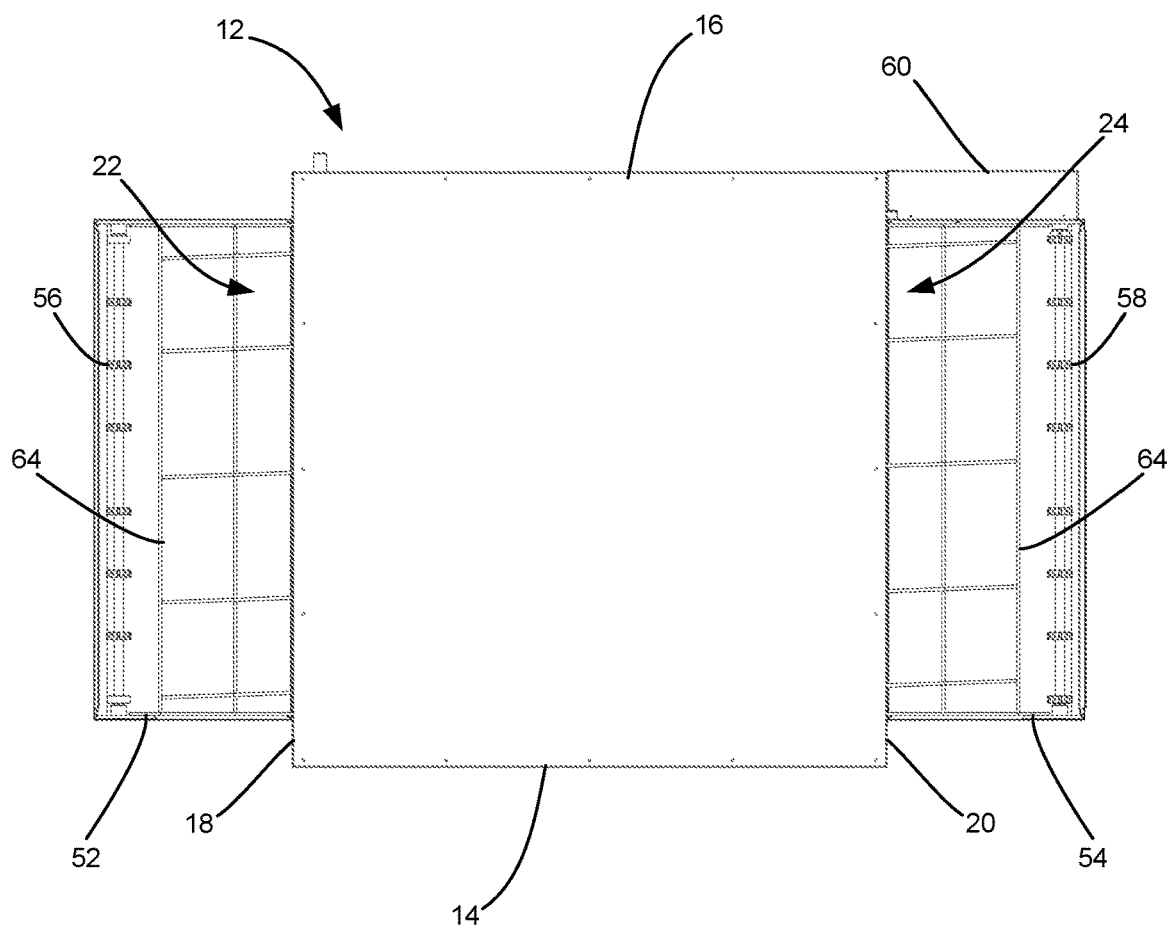
FIG. 3: is a top view of the oven of FIG. 1.
Figure 4:
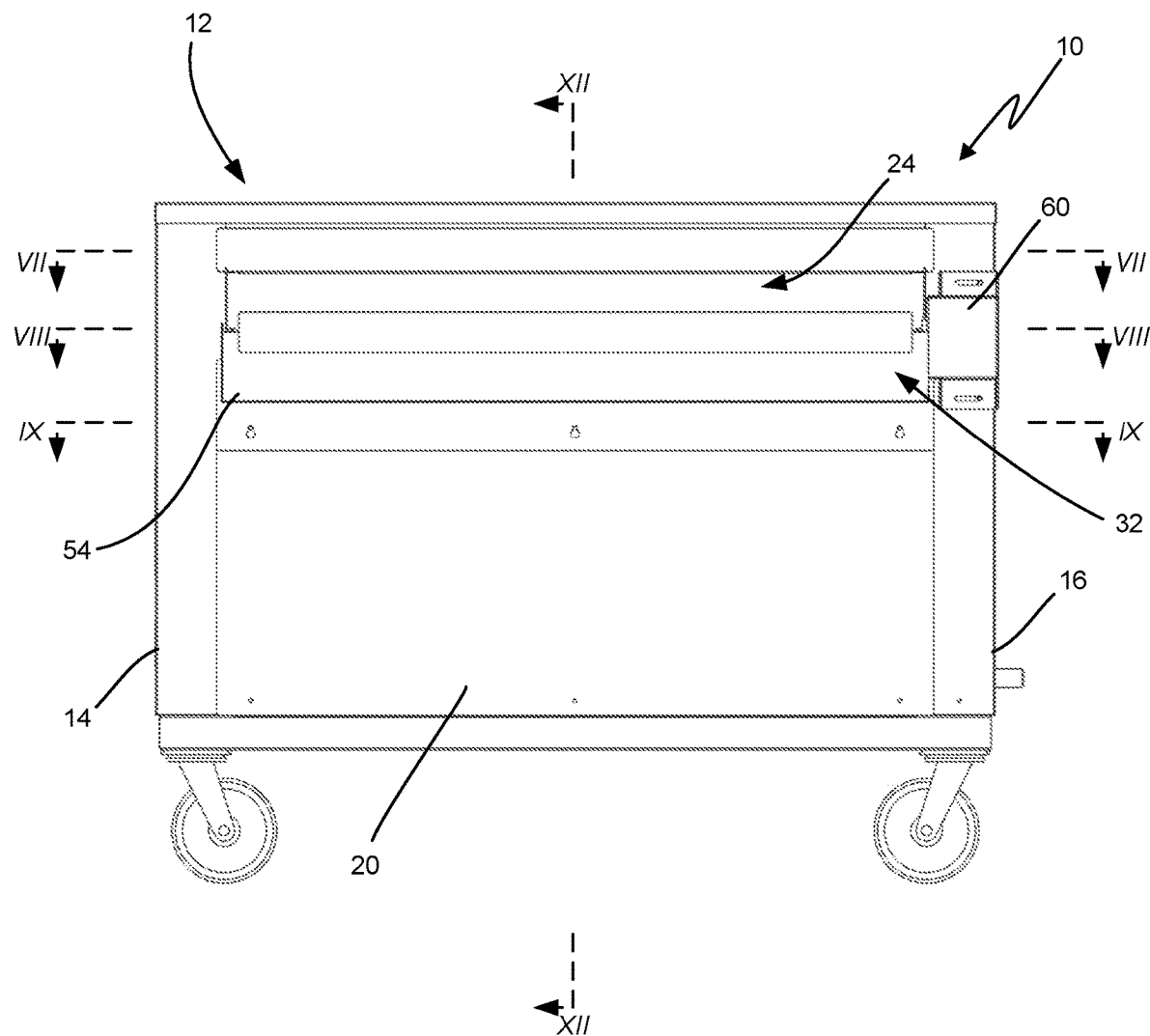
FIG. 4: is a right side view of the oven of FIG. 1.

FIGS. 1 to 12 show a conveyor-type oven 10 according to a first embodiment of the present invention. The oven 10 has a housing 12 that has a front wall 14, a rear wall 16, and two opposing longitudinal end walls 18, 20. The housing 12 has an opening 22, 24 at each of the two longitudinal end walls 18, 20. The housing 12 defines a baking chamber 26 within which food product—such as pizza—is to be cooked, and a primary chamber 28 that is positioned beneath the baking chamber 26.

A source of hot air is arranged to introduce hot air into the primary chamber 28. In this particular embodiment, the source of hot air is a blower gas burner 30 that receives combustible gas from a supply, burns that gas with air to discharge hot combustion products from a nozzle. The nozzle discharges the hot combustion products through a flame tube 31, which surrounds the nozzle of the burner 30, and into the primary chamber 28. Accordingly, in this embodiment, the hot air is introduced by the discharge of hot combustion products into the primary chamber 28.

For the purposes of this specification and claims, the term "hot air" is to be understood to include hot combustion products (for example, produced by combusting a mix of air and combustible gases), hot exhaust gases, and heated atmospheric air. Combustible gases include propane, natural gas, among others.

Figure 10:
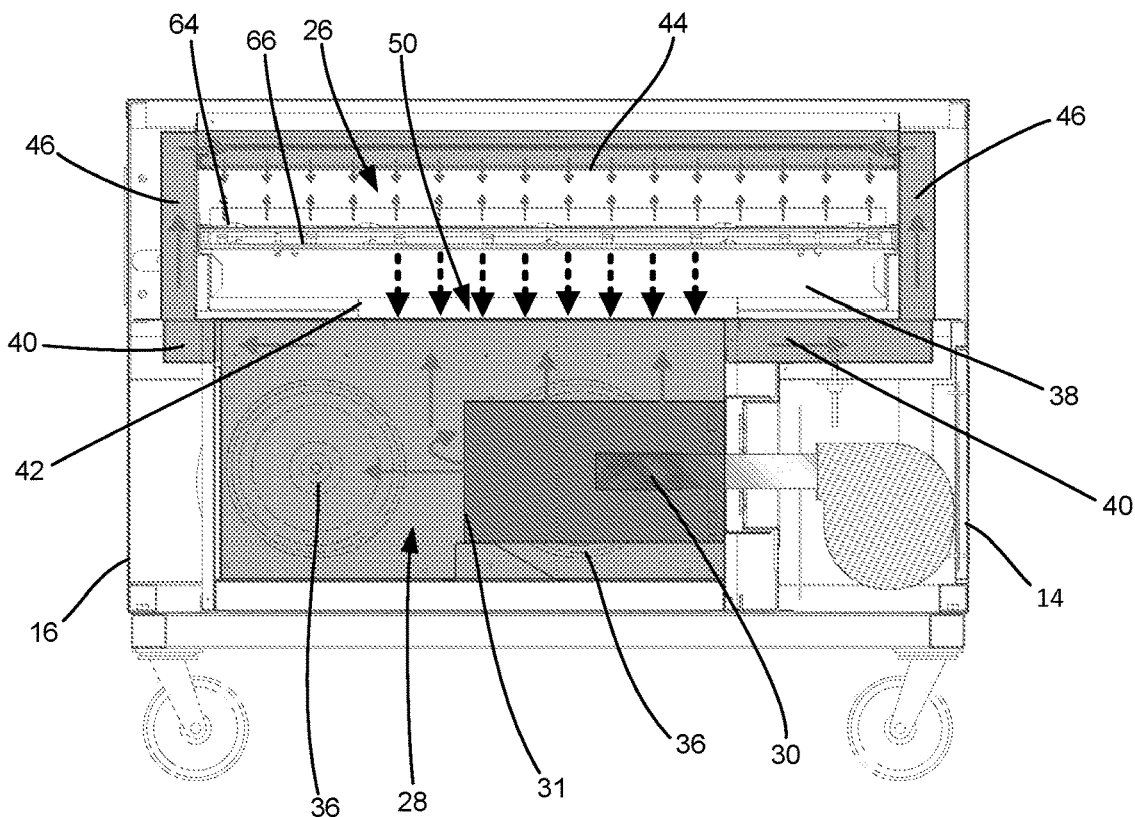
FIG. 10: is a cross section view of the oven, as viewed along the line X-X in FIG. 2.
Figure 11:
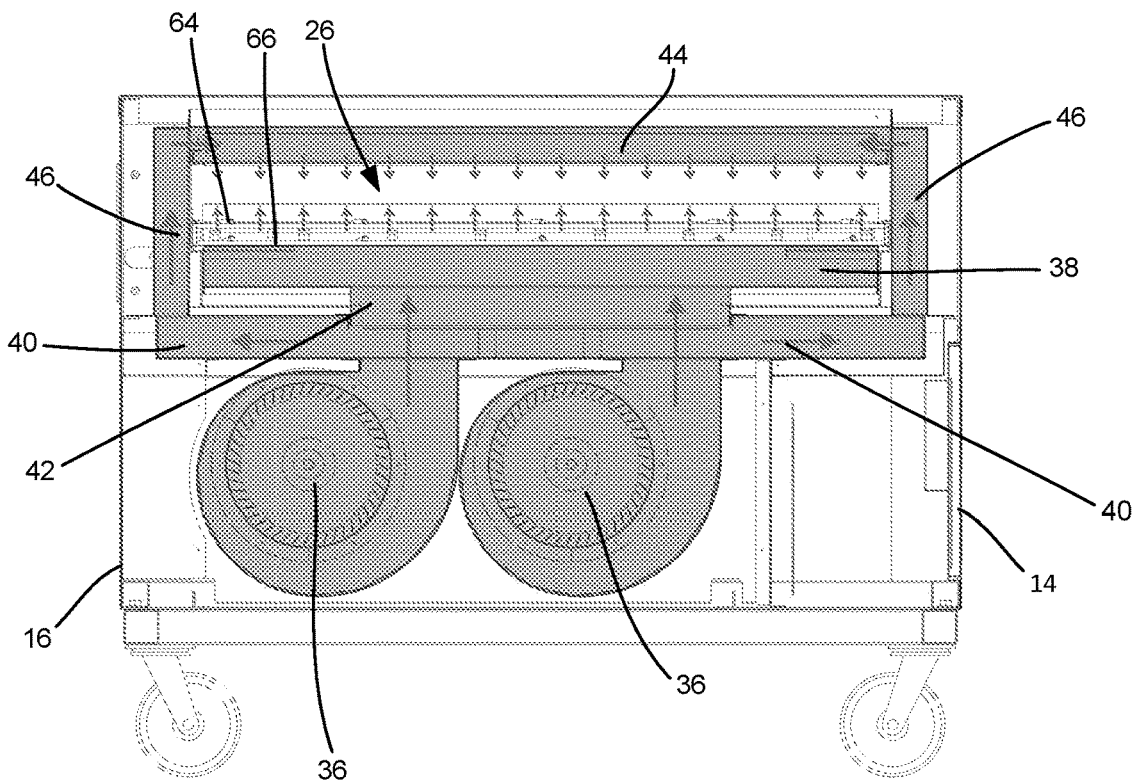
FIG. 11 is a cross section view of the oven, as viewed along the line XI-XI in FIG. 2.
Figure 12:
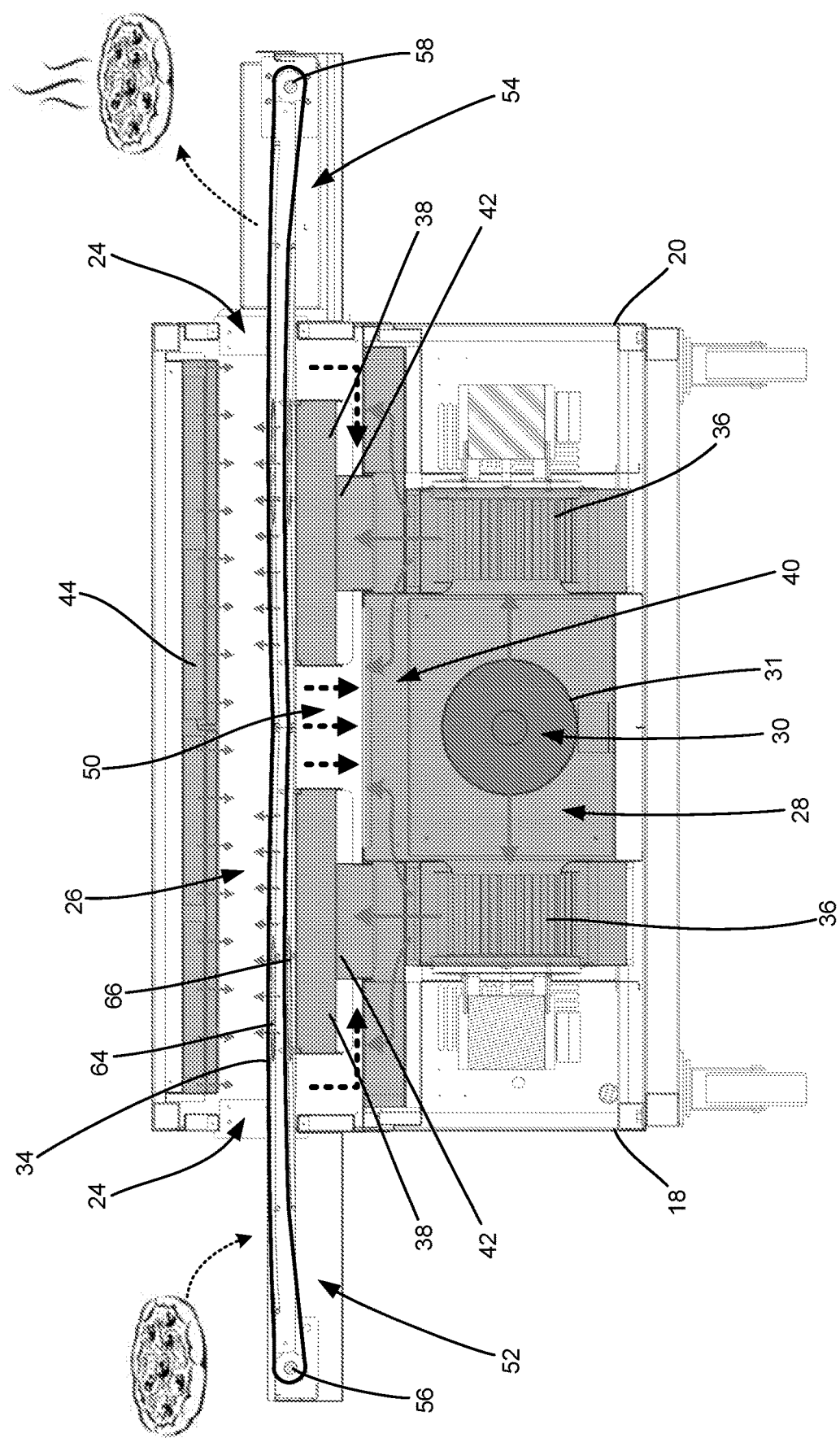
FIG. 12: is a cross section view of the oven, as viewed along the line XII-XII in FIG. 4.
Figure 13:
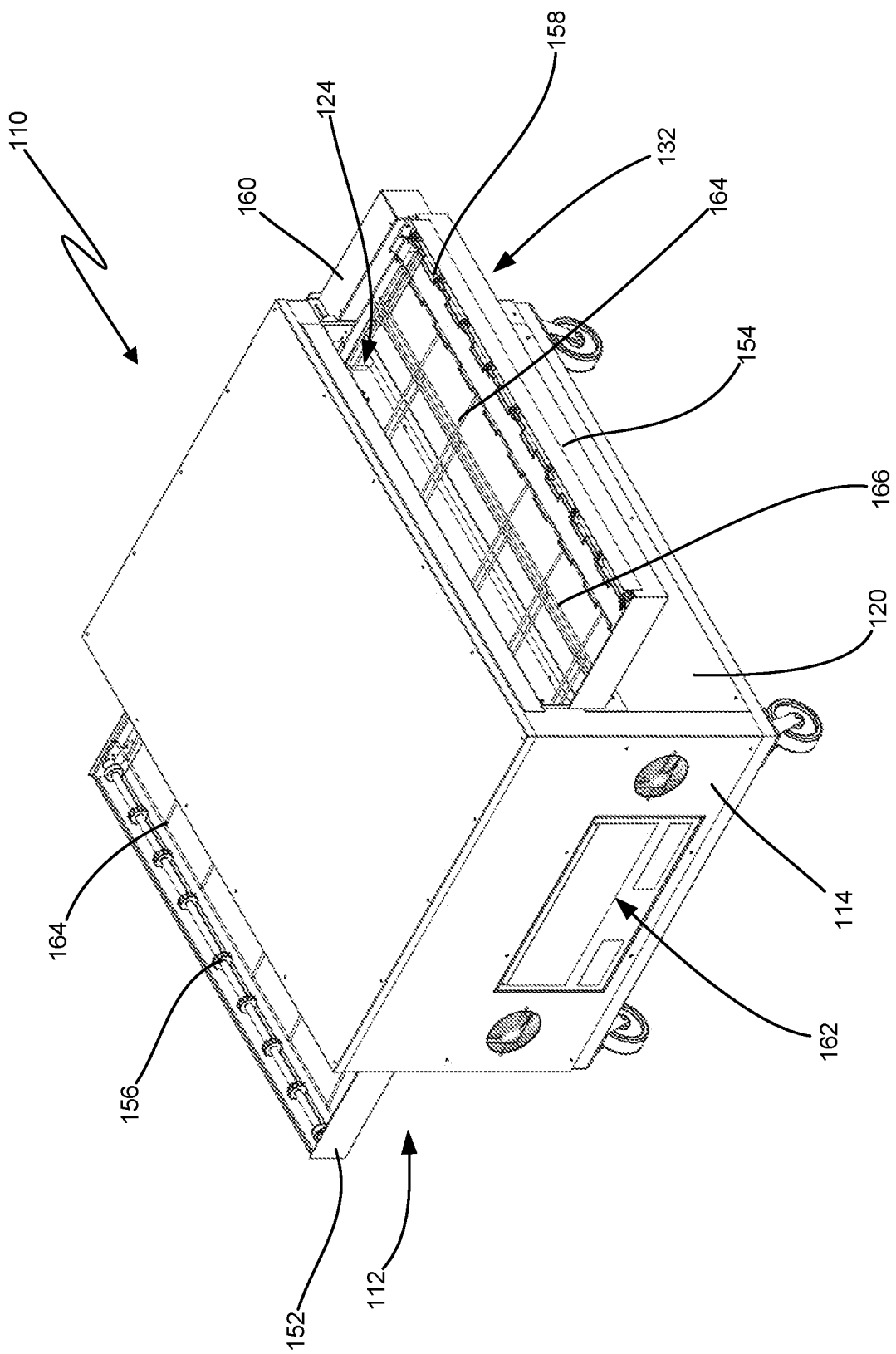
FIG. 13: is a perspective view of a conveyor-type oven in accordance with a second embodiment of the present invention.
Figure 14:
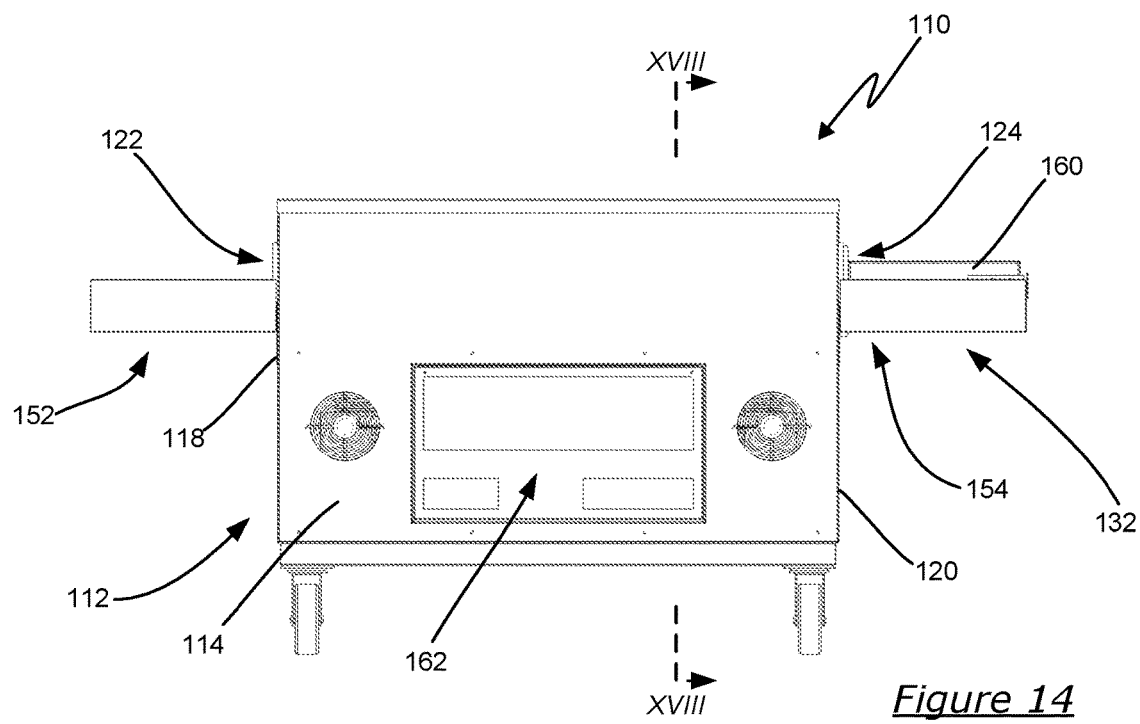
FIG. 14: is a front view of the oven of FIG. 13.
Figure 15:
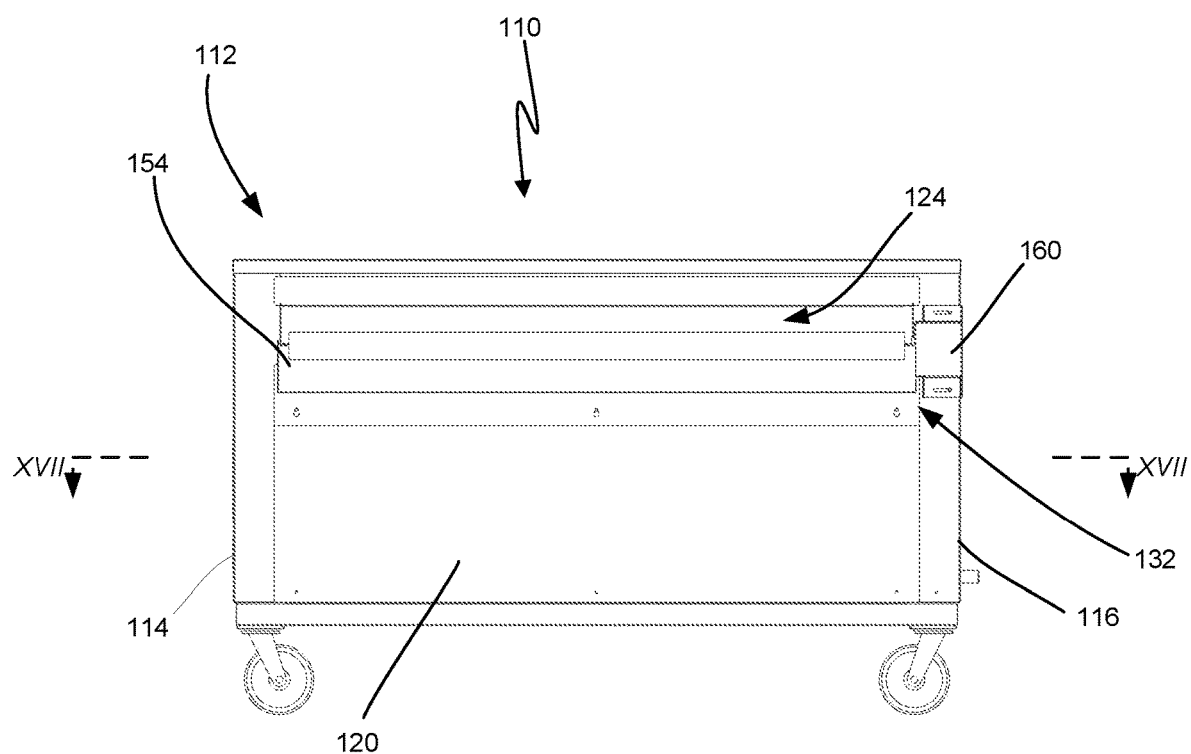
FIG. 15: is a right side view of the oven of FIG. 13.

The oven 12 has a conveyor assembly 32 that includes a continuous conveyor belt 34 (which is shown only in FIG. 12, and is omitted from FIGS. 1 to 11 for clarity). The belt 34 extends through the baking chamber 26, and the conveyor assembly 32 is driven so as to transport food to be cooked and that is placed on the belt 34 through the baking chamber 26. For the purposes of this specification, it will be understood that the direction of travel of the belt 34 defines a longitudinal direction of the oven 12 (although the assembly 32 may be operated to rotate the belt 34 in either direction without materially affecting the longitudinal direction).

Within the baking chamber 26, the oven 10 has an upper plenum assembly, and a lower plenum assembly. Ducting interconnects the primary chamber with the upper and lower plenum assemblies. The oven 10 further has fans 36 that are operable to transport hot air from the primary chamber 28 through the ducting to the upper and lower plenum assemblies from which it is discharged into the baking chamber 26. In the embodiment illustrated in FIGS. 1 to 12, there are four fans 36, and these are of the centrifugal type that are each driven by dedicated electrical motor.

The oven 12 has the benefit of the hot air being generated and distributed in the primary chamber 28, which is beneath the baking chamber 26. This is most evident from FIGS. 10 to 12 that show, schematically, the portions of the oven 12 that contain the hot air in use; these portions being the primary chamber 28, the fans 36, the ducting and the upper and lower plenum assemblies. This enables heated air to move in the direction of its natural buoyancy, and to enable a construction of oven that has a high degree of symmetry in the components that supply hot air to the baking chamber (the symmetry being considered in vertical planes extending through the centre of the baking chamber). In addition, the oven 12 has the benefit of the burner 30, fans 36, and parts of the ducting being underneath the baking chamber 26, which minimizes the footprint of the oven 12.

In this particular embodiment, the lower plenum assembly has two boxes 38 that each define one the lower plenum chambers. The ducting includes a manifold portion 40 that is to receive hot air from the fans 36, and two lower ducts 42 that each interconnect the manifold portion 40 with one of the boxes 38. The upper side of each box 38 has orifices from which to discharge hot air upwardly towards the belt 34. The orifices are evident in FIGS. 5 and 8, in which the upper side of each box 38 is visible.

In this embodiment, the upper plenum assembly has a box 44 that is supported by the housing 12 across the top of the baking chamber 26. The ducting further includes two upper ducts 46 that interconnect the manifold portion 40 with the box 44. Each upper duct 46 extends upwardly beside the baking chamber 26 and opens into the long sides of the box 44. As is particularly evident from FIGS. 10 and 11, the upper ducts 46 are on opposing sides of the baking chamber 26 so that the hot air enters the box 44 on opposing sides. This symmetrical arrangement facilitates a high degree of symmetry in the gas flows into the box 44. The lower side of the box 44 has orifices from which to discharge hot air downwardly towards the belt 34. The orifices are evident in FIGS. 5 to 7, in which the lower side of the box 44 is visible.

The orifices in the boxes 38, 44 operate to release hot air towards the conveyor belt. In some alternative embodiments, the boxes may each have an orifice at the end of a short tube, which is known in this field as a "finger".

The housing 12 includes an internal divider 48 that is positioned between the primary chamber 28 and the baking chamber 26. The divider 48 has a divider opening 50, which is shown in FIGS. 5, 8, 9 and 12. In use of the oven 12, air within the baking chamber 26 is able to propagate through the divider opening 50 and into the primary chamber 28. As will be appreciated, it is the cooler air within the baking chamber 26 that moves to the bottom of the baking chamber 26, and is able to return to the primary chamber 28 via the divider opening 50. In operation of the oven 12, the baking chamber 26 may have an operating temperature in the order of approximately 220° C. to 320° C. Although the gas returning to the primary chamber 28 is cooler than the operating temperature, it will be appreciated that the return of the air enables the more efficient operation of the burner 30. This has the benefit of enabling a reduction in the operating costs of the oven 12.

Figure 8:
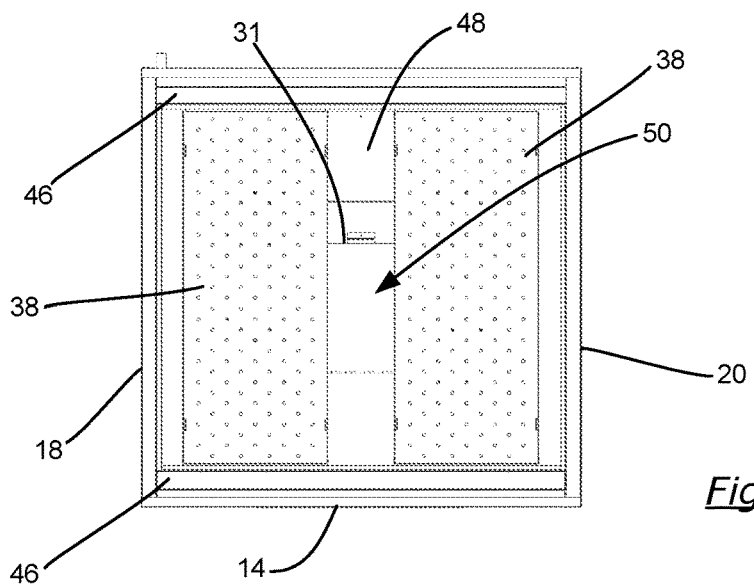
FIG. 8: is a cross section view of the oven, as viewed along the line VIII-VIII in FIG. 4, with the conveyor assembly omitted.

To facilitate the movement of cooler gas towards the divider opening 50, the boxes 38 of the lower plenum assembly are spaced apart in the longitudinal direction. Conveniently, in this embodiment the divider opening 50 is vertically aligned with the separation of the boxes 38 (as shown in FIG. 8). In addition, in this embodiment the floor of each of the boxes 38 is vertically spaced above the divider 48. In this way, cooler gas within the baking chamber 26 can propagate beneath the boxes 38, through the divider opening 50, and into the primary chamber 28 in use of the oven 12.

Figure 7:
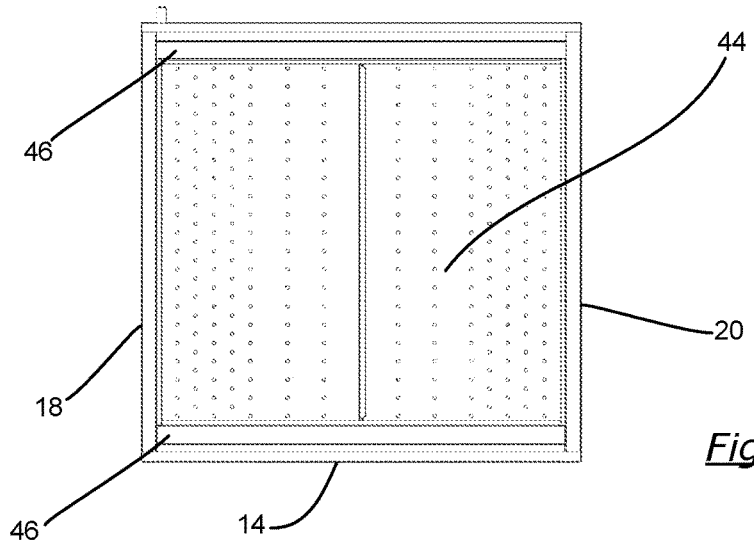
FIG. 7: is a cross section view of the oven, as viewed along the line VII-VII in FIG. 4, with the conveyor assembly omitted.

The boxes 38, 44 of both the lower and upper plenum assemblies extend transversely the full width of the baking chamber 26, such that hot air is supplied evenly across the width of the baking chamber 26. However, as will be evident from FIG. 12, the upper plenum assembly is arranged to provide an air curtain effect across each of the openings 22, 24 to the baking chamber 26. To this end, the opposing longitudinal ends of the box 44 are closer to the openings 22, 24 than the longitudinally outer ends of the two boxes 38. Further, the density of orifices in the lower side of the box 44 is higher in regions adjacent the openings 22, 24, than in the central region of the box 44. The lower side of the box 44 has fourteen rows of orifices; each row extending linearly in a transverse direction across the baking chamber 26. As is shown in FIG. 7, the separation of the two groups of five rows of orifices adjacent each longitudinal end wall 18, 20 of the housing 12 is half the separation of the four rows of orifices that are between these two groups. The air curtain effect operates to minimize heat loss through the openings 22, 24.

Figure 9:
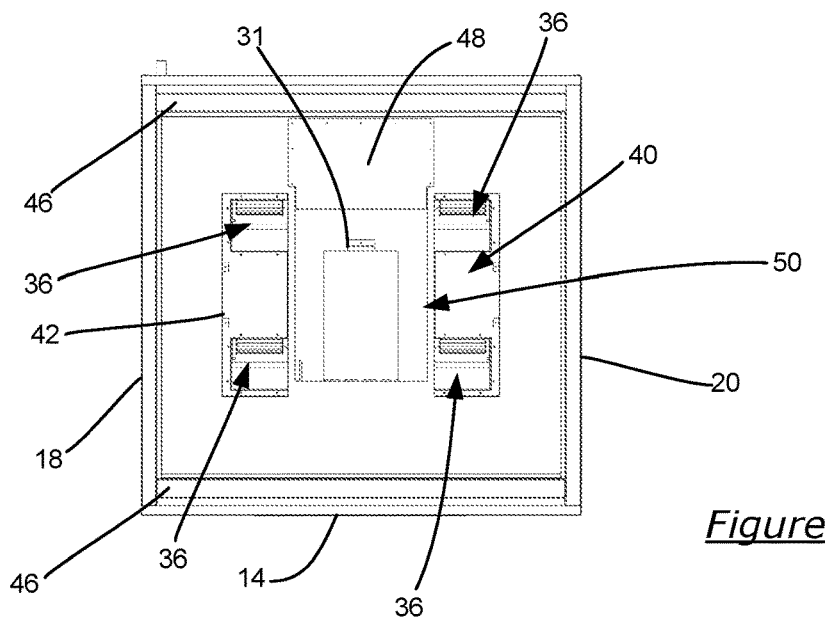
FIG. 9: is a cross section view of the oven, as viewed along the line IX-IX in FIG. 4, with the conveyor assembly omitted.

FIGS. 7 to 9 are horizontal cross section views of the oven 12, in which the conveyor assembly has been removed for clarity. FIG. 7 is a section view through the centre of the box 44, such that the lower side of the box 44 is visible; and in particular, the orifices of the upper plenum assembly are visible. FIG. 8 is a section view through the centre of the baking chamber 26, such that the upper sides of the boxes 38 of the lower plenum assembly are visible. FIG. 9 is a section view taken between the lower side of the boxes 38 and the divider 48. In FIG. 9, the gas outlets of the four fans 36, and the flame tube around the nozzle of the burner 30 are visible. The lower ducts 42 are evident in FIG. 12.

In addition to the conveyor belt 34, the conveyor assembly 32 also has a first outer portion 52 and a second outer portion 54. Each of the first and second outer portions 52, 54 supports the belt 34 outwardly of the respective first and second openings 22, 24. Each of the first and second outer portions 52, 54 has a drum roller 56, 58 about which the belt 34 is to rotate. The conveyor assembly 32 also has a drive for causing the conveyor belt 32 to rotate. In this embodiment, the drive is contained within a drive box 60. The oven 12 has an operating panel 62 on the front wall 14, from which a user can adjust the operating parameters of the oven 12, such as the baking chamber temperature, and the belt speed and direction. The first and second outer portion 52, 54 each include a crumb tray, and the second outer portion 54 includes a tray stop to prevent unattended trays with cooked food from falling from the oven 10. In some alternative embodiments in which the conveyor belt is to be operable in either direction, a tray stop may also be provided on the first outer portion. In some embodiments, the tray stop can be interchanged between the first and second outer portions so as to be mounted at the appropriate end having regard to the direction of the conveyor belt rotation.

The belt 34 is preferably made of a stainless steel wire mesh through which gas is readily able to pass so that hot gases may reach the underside of a food product resting on the belt. As is indicated in FIG. 12, an uncooked food product, such as pizza, is loaded onto the belt on one of the outer portions of the conveyor assembly 32. After travelling on the belt 34 through the baking chamber 26, the cooked food product is available to be unloaded on the other of the outer portions.

The conveyor assembly 32 also has a support frame that extends through the baking chamber 26 to provide vertical support to the belt 34. In this embodiment, the support frame includes an upper frame 64 that is to support the belt 34 whilst transporting food to be cooked through the baking chamber 26, and a lower frame 66 that is to support the belt 34 in a return traversal (in other words, when the belt is travelling in the opposite direction) of the baking chamber 26.

The upper and lower frames 64, 66 can each include two frame sections, and these frame sections are arranged beside each other in the longitudinal direction of the oven 12. In the illustrated embodiment, each frame section is curved in a vertical plane. Each of the upper and lower frames 64, 66 has first support members that extend generally transversely to the longitudinal direction, and second support members that extend obliquely to the longitudinal direction. Thus, the first and second support members are neither parallel nor perpendicular with the second support members. The oblique arrangement of the second support members has the benefit of spreading wear across the width of the belt 34. In addition, the heat variation caused by the second support members is spread across the length of the baking chamber 26. In uses of the oven 12 in which the food product is placed directly onto the belt 34 (that is, in which a cooking tray is not used) the variation in cooking of the under side of the food product is spread across the food product. For example, the base of a cooked pizza is less likely to have stripes of uncooked, or partially cooked, pizza dough.

Figure 5:
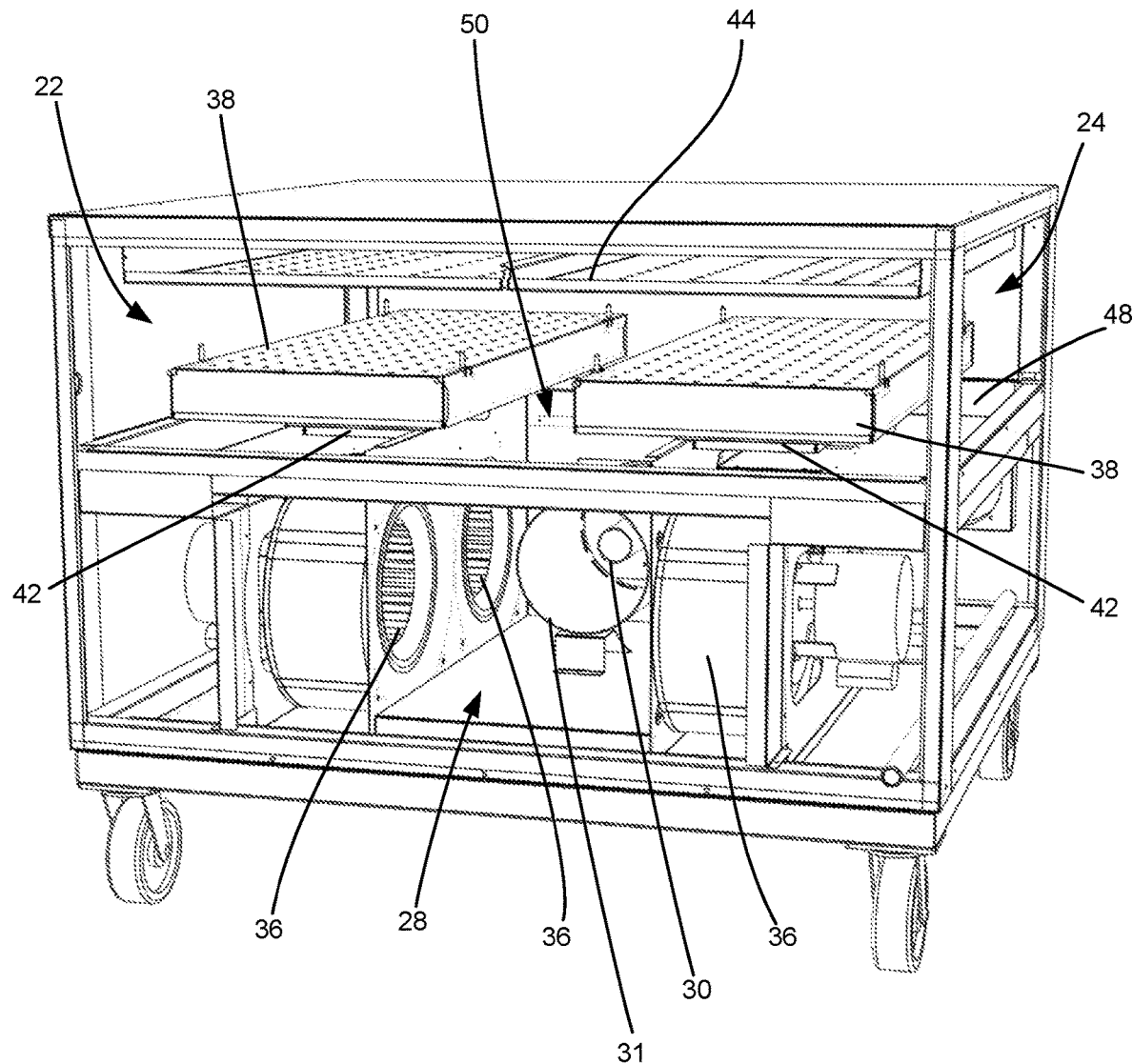
FIG. 5: is a front, right perspective view of the oven of FIG. 1, with the conveyor assembly, and side and end panels omitted.
Figure 6:
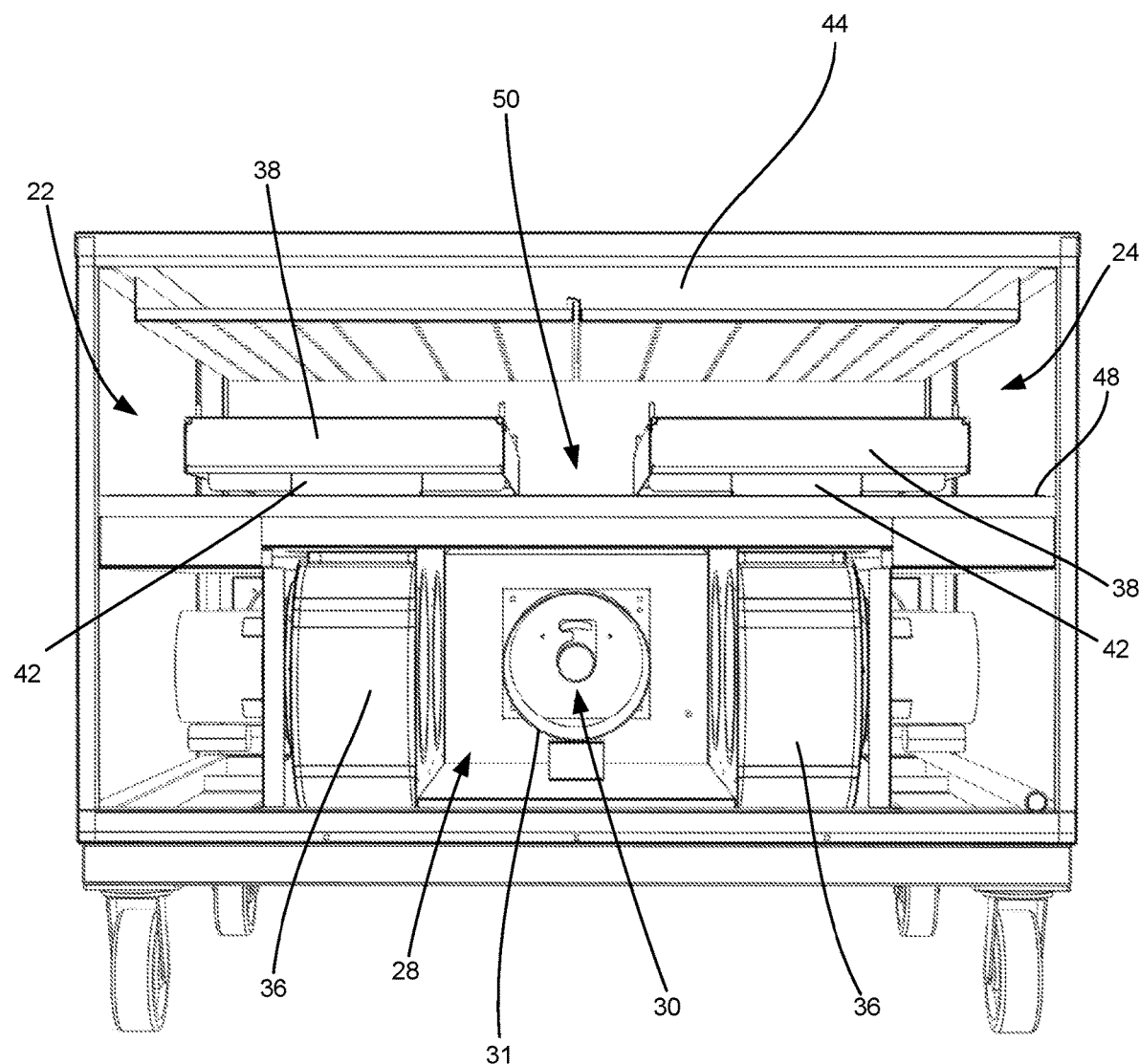
FIG. 6: is a left side view of the oven as shown in FIG. 5.

As is shown most clearly in FIGS. 5 and 6, in this embodiment the oven 12 has a bank of two fans 36 at each longitudinal end of primary chamber 28. The burner 30 is arranged with its nozzle and flame tube positioned to discharge hot air into the primary chamber 28 centrally between the two banks of fans 36.

In FIGS. 10 to 12, the movement of hot air that is discharged from the burner 30 into the primary chamber 28, and then into the ducting, the lower and upper plenum assemblies, and discharged from the orifices (into the baking chamber 26) is shown in the shaded portions, and also by means of solid line arrows. The movement of cooler gas towards and/or through the divider opening 50 is shown by means of dashed line arrows.

The oven 12 has a conveyor belt width so as to be capable of being loaded with three "lanes" of 30 cm diameter pizza trays. In FIGS. 5 and 6, the location of the openings 22, 24 is indicated to facilitate identification of the orientation of the view, although it will be understood that the openings are not visible in these views.

FIGS. 13 to 18 show a conveyor-type oven 110 according to a second embodiment of the present invention. The oven 110 is substantially similar to the oven 10 of FIGS. 1 to 12. In FIGS. 13 to 18, the features of the oven 110 that are substantially similar to those of the oven 10 have the same reference numeral with the prefix "1".

Figure 16:
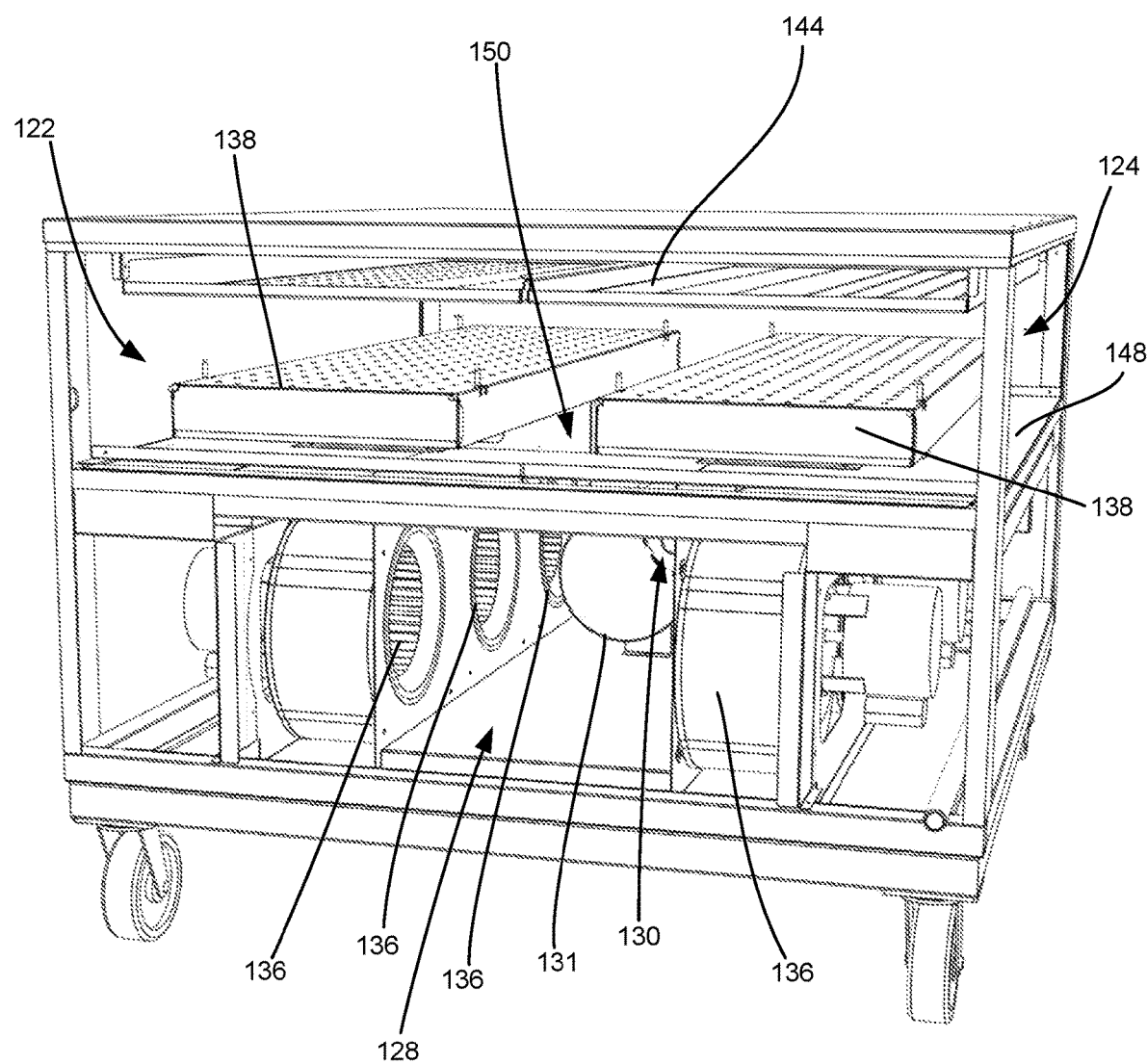
FIG. 16: is a front, right perspective view of the oven of FIG. 13, with the conveyor assembly, and side and end panels omitted.
Figure 17:
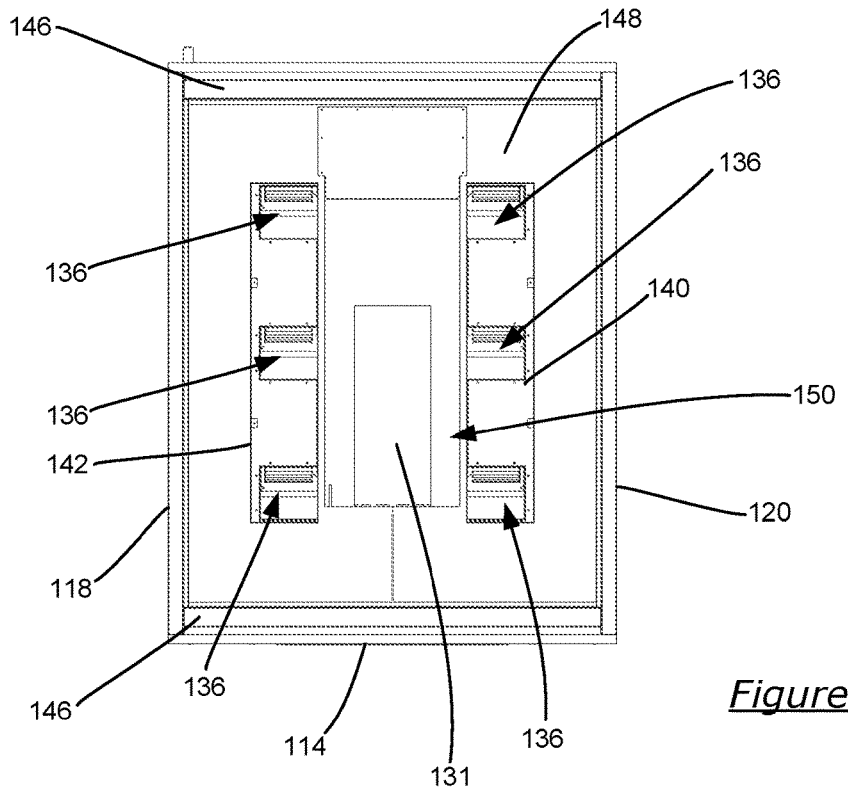
FIG. 17: is a cross section view of the oven, as viewed along the line XVII-XVII in FIG. 15.
Figure 18:
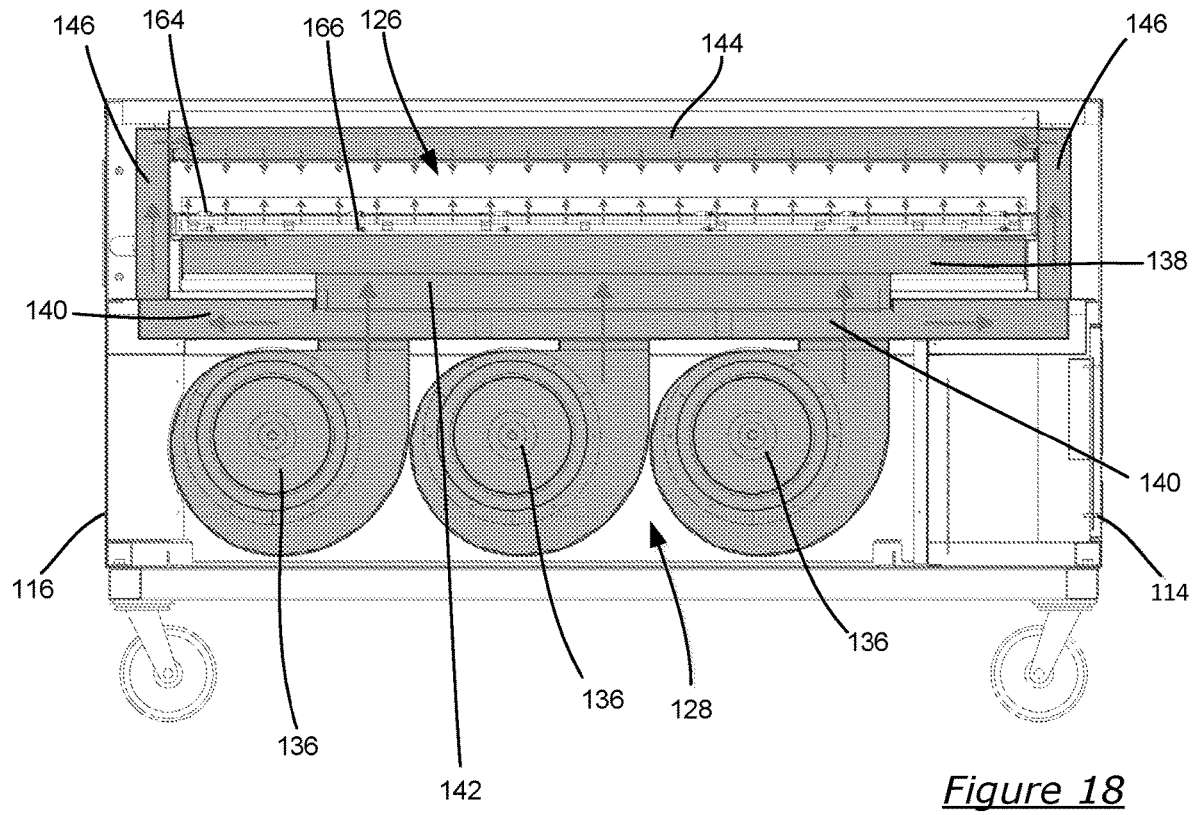
FIG. 18: is a cross section view of the oven, as viewed along the line XVIII-XVIII in FIG. 14.
Figure 19:
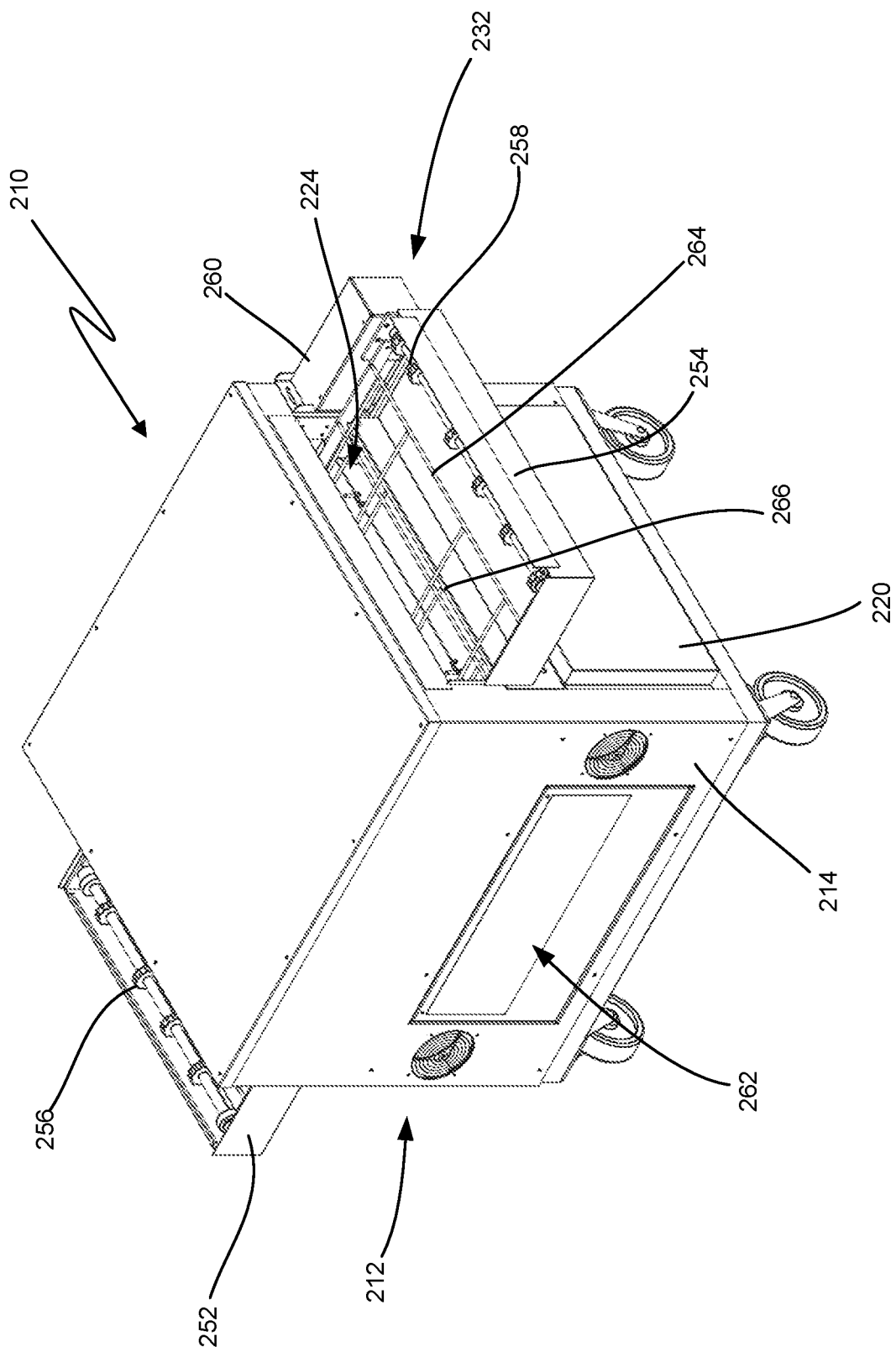
FIG. 19: is a perspective view of a conveyor-type oven in accordance with a third embodiment of the present invention.
Figure 20:
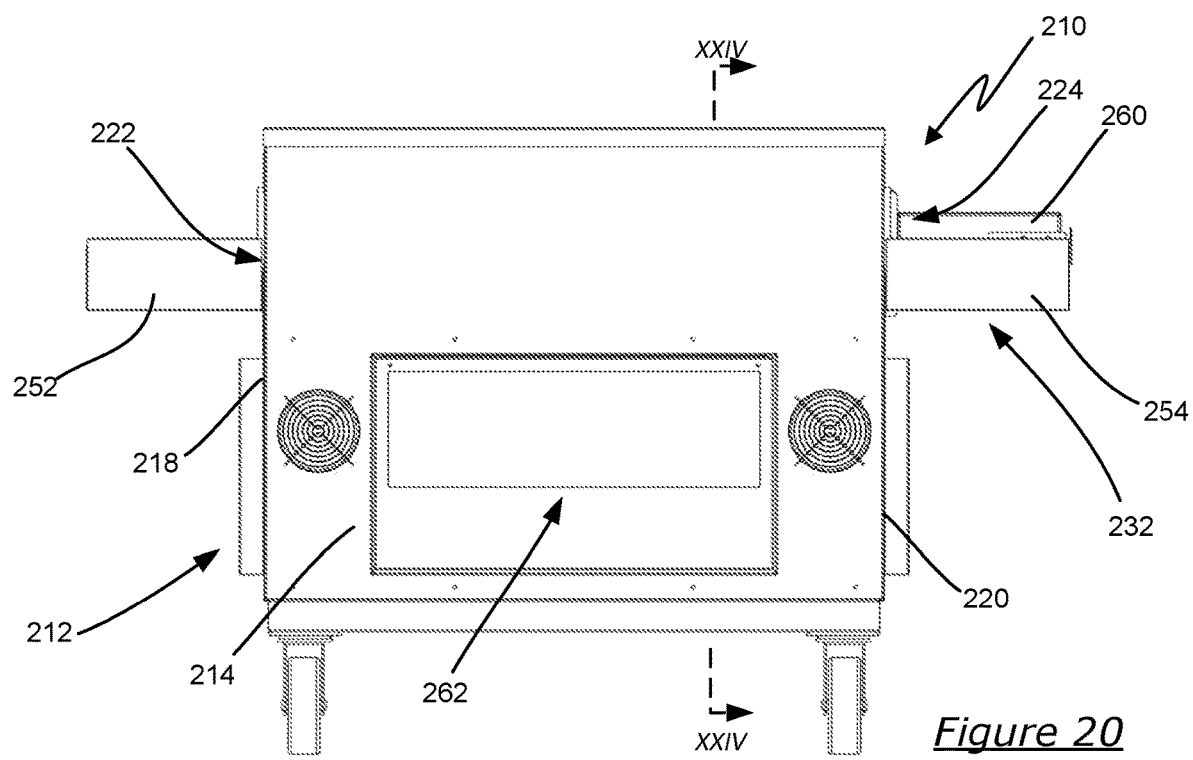
FIG. 20: is a front view of the oven of FIG. 19.
Figure 21:
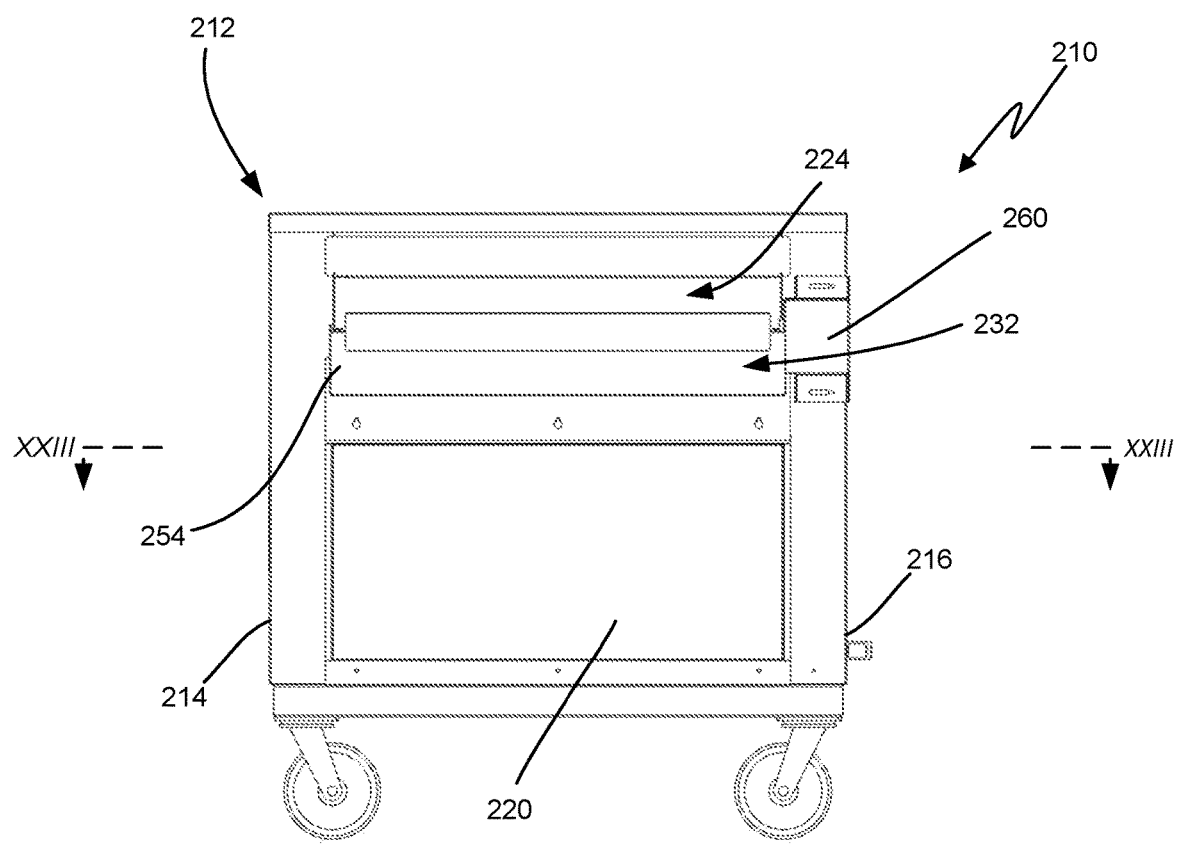
FIG. 21: is a right side view of the oven of FIG. 19.

FIGS. 13 to 15, and 18 show the conveyor assembly 132, although the continuous conveyor belt is omitted from these figures for clarity. In FIGS. 16 and 17, the entire conveyor assembly 132 is omitted in its entirety. In FIG. 18, the movement of hot air that is moved by the fans 136 from the primary chamber 128, into the ducting, the lower and upper plenum assemblies, and discharged from the orifices (into the baking chamber 126) is shown in the shaded portions, and also by means of solid line arrows.

The oven 10 is to have a conveyor belt width that is capable of being loaded with three "lanes" of 30 cm diameter pizza trays. In contrast, the oven 110 is to have a conveyor belt width that is capable of being loaded with four "lanes" of 30 cm diameter pizza trays. The baking chamber 126 of the oven 110 is wider to accommodate the greater width of the belt. As a consequence of this greater width, the oven 110 has two banks of three fans 136; one bank at each longitudinal end of the primary chamber 128. In other words, the oven 110 has six fans 136. FIG. 16 shows the two banks of fans 136 with the nozzle of the burner 130 and the flame tube 131 positioned to discharge hot air centrally into the primary chamber 128, and between the two banks of fans 136.

FIGS. 19 to 24 show a conveyor-type oven 210 according to a third embodiment of the present invention. The oven 210 is substantially similar to the oven 10 of FIGS. 1 to 12. In FIGS. 19 to 24, the features of the oven 210 that are substantially similar to those of the oven 10 have the same reference numeral with the prefix "2".

Figure 22:
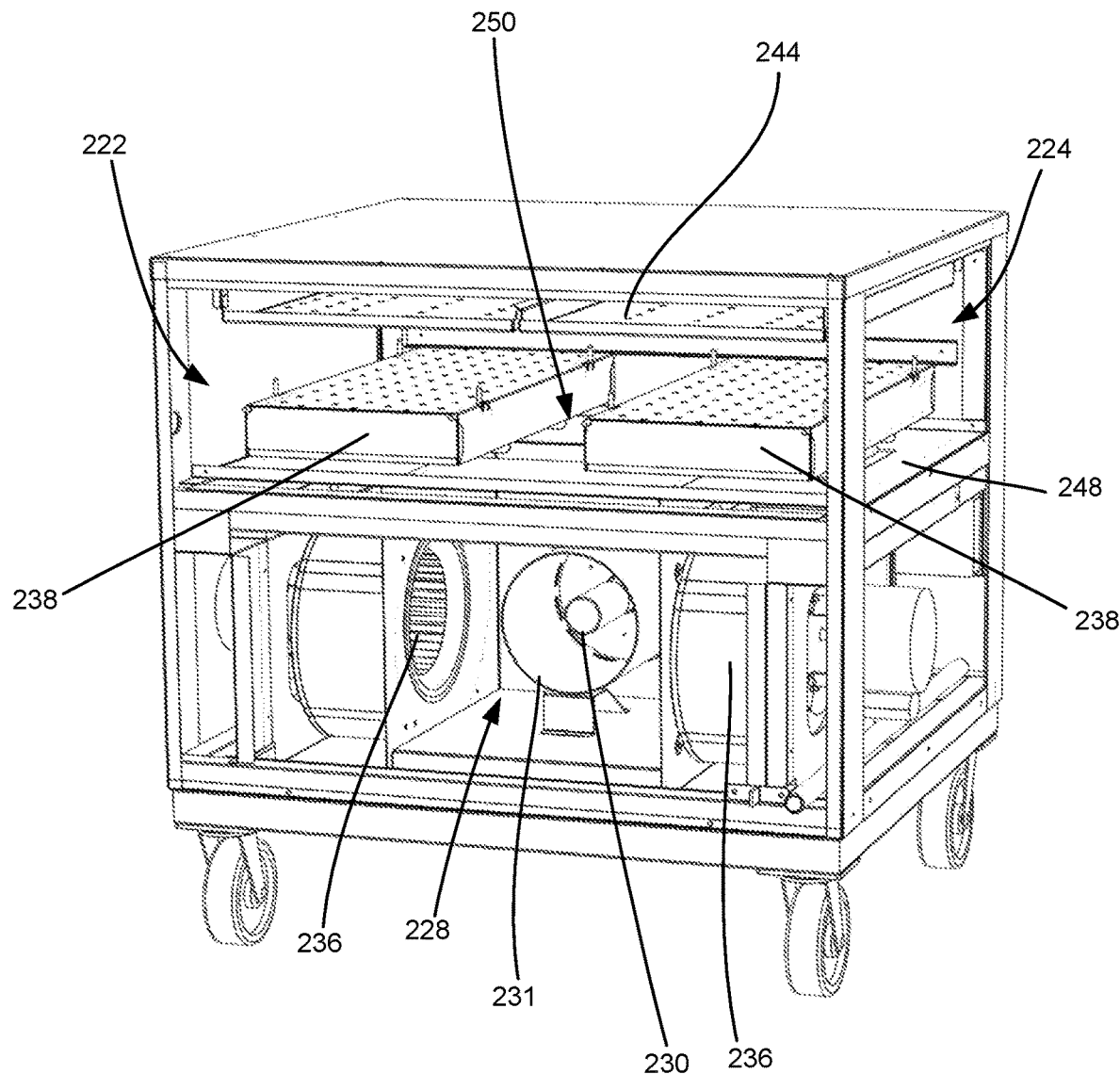
FIG. 22: is a front, right perspective view of the oven of FIG. 19, with the conveyor assembly, and side and end panels omitted.
Figure 23:
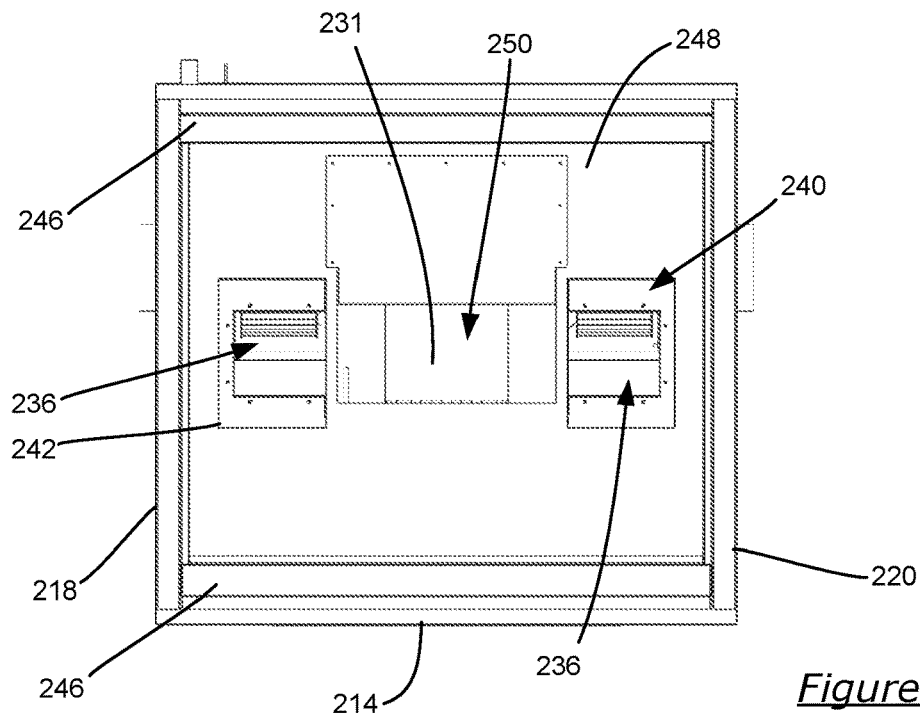
FIG. 23: is a cross section view of the oven, as viewed along the line XVIII-XXIII in FIG. 21.
Figure 24:
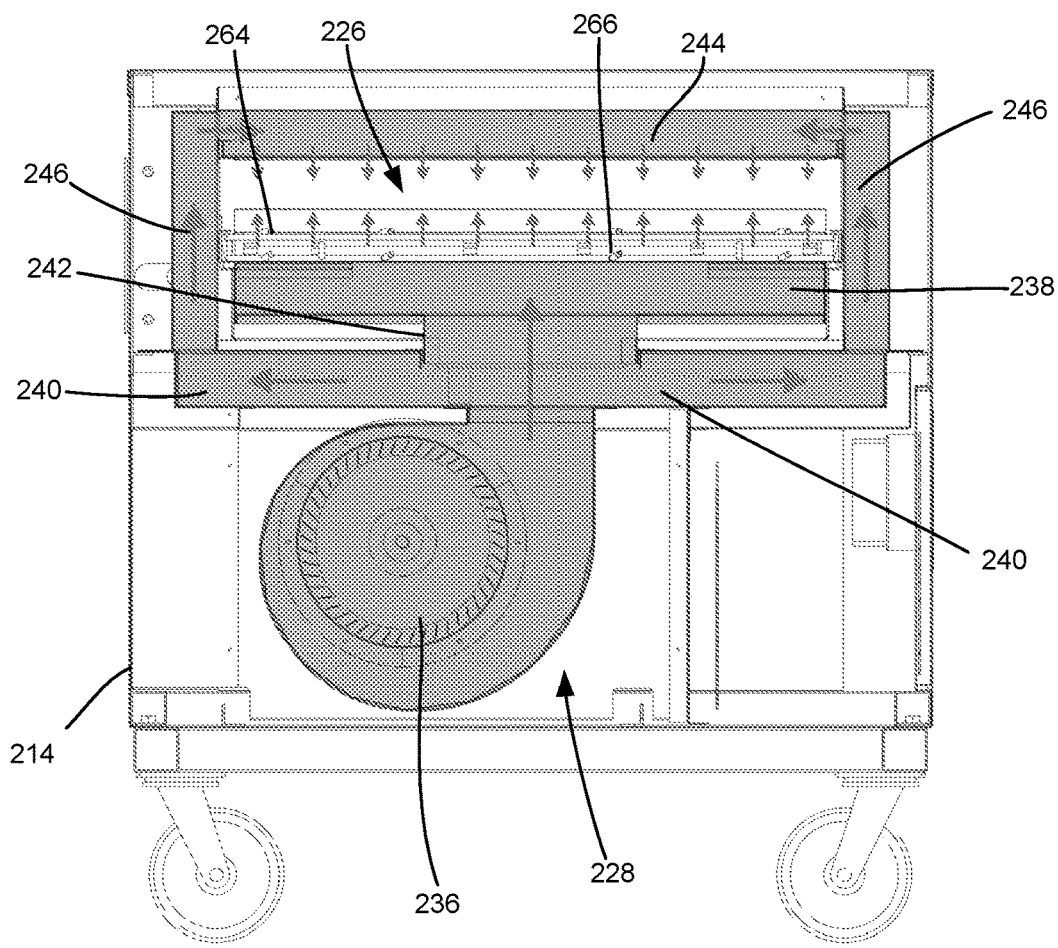
FIG. 24: is a cross section view of the oven, as viewed along the line XXIV-XXIV in FIG. 20.

FIGS. 19 to 21, and 24 show the conveyor assembly 232, although the continuous conveyor belt is omitted from these figures for clarity. In FIG. 22, the entire conveyor assembly 232 is omitted in its entirety. In FIG. 24, the movement of hot air that is moved by the fans 236 from the primary chamber 228, into the ducting, the lower and upper plenum assemblies, and discharged from the orifices (into the baking chamber 226) is shown in the shaded portions, and also by means of solid line arrows.

The oven 210 is to have a conveyor belt width that is capable of being loaded with 30 cm diameter pizza trays in two "lanes". The baking chamber 226 of the oven 210 is narrower as it only needs to accommodate a relatively narrow width of the belt. As a consequence of this narrower width, the oven 210 has two fans 236; one at either longitudinal end of the primary chamber 228. As shown in FIG. 22, the burner 230 and flame tube 231 are positioned to discharge hot air centrally into the primary chamber 228, and between the two fans 236.

It will be appreciated that the present invention is not limited to embodiments in which hot air is introduced into the primary chamber by a gas burner. In some alternative embodiments, hot air may be introduced into the primary chamber by a resistive-type heating element (or elements). The heat exchange between the heating elements and the air may occur within the primary chamber, or in a separate space and then introduced into the primary chamber.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention has been described by way of non-limiting example only and many modifications and variations may be made thereto without departing from the spirit and scope of the invention.

The invention claimed is:

1. A conveyor-type oven comprising:
   a housing defining a baking chamber, and a primary chamber that is positioned beneath the baking chamber, the baking chamber having two longitudinal ends, and the housing having an opening at each of the two longitudinal ends of the baking chamber;
   a source of hot air underneath the baking chamber that is arranged to introduce hot air into the primary chamber;
   a continuous conveyor belt for transporting food to be cooked through the baking chamber;

an upper plenum assembly that is disposed in the baking chamber and includes a plurality of orifices from which to discharge hot air downwardly towards the conveyor belt;

a lower plenum assembly that is disposed in the baking chamber and includes a plurality of orifices from which to discharge hot air upwardly towards the conveyor belt;

ducting that interconnects the primary chamber with the upper and lower plenum assemblies, wherein the ducting includes lower ducts underneath the baking chamber that interconnect the primary chamber with the lower plenum assembly, and wherein the ducting includes two upper ducts that each extends upwardly beside the baking chamber and opens into the upper plenum assembly; and one or more fans that are operable to transport hot air from the primary chamber through the ducting to the upper and lower plenum assemblies.

2. The conveyor-type oven according to claim 1, wherein the lower plenum assembly comprises two or more lower plenum chambers, and wherein each lower duct opens into a respective lower plenum chamber.

3. The conveyor-type oven according to claim 2, wherein the housing includes a divider between the primary chamber and the baking chamber, the divider having a divider opening, whereby, in use, air within the baking chamber is able to propagate through the divider opening and into the primary chamber.

4. The conveyor-type oven according to claim 3, wherein the lower plenum chambers are spaced apart, such that, in use of the oven, air within the baking chamber is able to propagate through a space between the lower plenum chambers, through the divider opening, and into the primary chamber.

5. The conveyor-type oven according to claim 3, wherein the divider opening is vertically aligned with a separation of the lower plenum chambers.

6. The conveyor-type oven according to claim 3, wherein the lower plenum assembly has a floor that is spaced from the divider, such that, in use of the oven, air within the baking chamber is able to propagate beneath the lower plenum assembly, through the divider opening, and into the primary chamber.

7. The conveyor-type oven according to claim 1, wherein the upper plenum assembly is arranged to provide an air curtain effect across each of the openings.

8. The conveyor-type oven according to claim 1, wherein the ducting includes a manifold portion that is to receive hot air from the one or more fans, and opens into the upper ducts and the lower ducts.

9. The conveyor-type oven according to claim 1, wherein the conveyor belt is part of a conveyor assembly that comprises:

a first outer portion that supports the conveyor belt outwardly of a first of the openings;

a second outer portion that supports the conveyor belt outwardly of a second of the openings;

a first drum mounted on the first outer portion about which the conveyor belt is to rotate;

a second drum mounted on the second outer portion about which the conveyor belt is to rotate; and a drive for causing the conveyor belt to rotate.

10. The conveyor-type oven according to claim 9, wherein the conveyor assembly further comprises a support frame that extends through the baking chamber, and provides vertical support to the conveyor belt.

11. The conveyor-type oven according to claim 1, wherein the oven has a bank of one or more fans adjacent to each longitudinal end of the primary chamber.

12. The conveyor-type oven according to claim 1, wherein source of hot air is a gas burner that is arranged to introduce hot air into the primary chamber.

13. The conveyor-type oven according to claim 5, wherein the lower plenum assembly has a floor that is spaced from the divider, such that, in use of the oven, air within the baking chamber is able to propagate beneath the lower plenum assembly, through the divider opening, and into the primary chamber.

14. The conveyor-type oven according to claim 13, wherein the upper plenum assembly is arranged to provide an air curtain effect across each of the openings.

15. The conveyor-type oven according to claim 13, wherein the ducting includes a manifold portion that is to receive hot air from the one or more fans, and opens into the upper ducts and the lower ducts.

16. The conveyor-type oven according to claim 15, wherein the oven has a bank of one or more fans adjacent to each longitudinal end of the primary chamber.

17. The conveyor-type oven according to claim 10, wherein the oven has a bank of one or more fans adjacent to each longitudinal end of the primary chamber.

18. The conveyor-type oven according to claim 17, wherein source of hot air is a gas burner that is arranged to introduce hot air into the primary chamber.

19. The conveyor-type oven according to claim 1, wherein the ducting includes two upper ducts on opposing sides of the baking chamber.

\* \* \* \* \*